United States Patent
Abramoff et al.

(10) Patent No.: US 10,410,355 B2
(45) Date of Patent: Sep. 10, 2019

(54) METHODS AND SYSTEMS FOR IMAGE ANALYSIS USING NON-EUCLIDEAN DEFORMED GRAPHS

(71) Applicant: UNIVERSITY OF IOWA RESEARCH FOUNDATION, Iowa City, IA (US)

(72) Inventors: Michael D. Abramoff, Iowa City, IA (US); Li Tang, Iowa City, IA (US); Xiaodong Wu, Coralville, IA (US)

(73) Assignees: U.S. Department of Veterans Affairs, Washington, DC (US); UNIVERSITY OF IOWA RESEARCH FOUNDATION, Iowa City, IA (US)

( * ) Notice: Subject to any disclaimer, the term of this patent is extended or adjusted under 35 U.S.C. 154(b) by 0 days.

(21) Appl. No.: 15/128,035

(22) PCT Filed: Mar. 23, 2015

(86) PCT No.: PCT/US2015/022021
§ 371 (c)(1),
(2) Date: Sep. 21, 2016

(87) PCT Pub. No.: WO2015/143435
PCT Pub. Date: Sep. 24, 2015

(65) Prior Publication Data
US 2017/0098311 A1    Apr. 6, 2017

Related U.S. Application Data

(60) Provisional application No. 61/968,713, filed on Mar. 21, 2014.

(51) Int. Cl.
G06T 7/11    (2017.01)
G06T 7/162    (2017.01)

(52) U.S. Cl.
CPC ............... *G06T 7/162* (2017.01); *G06T 7/11* (2017.01); *G06T 2207/10081* (2013.01);
(Continued)

(58) Field of Classification Search
None
See application file for complete search history.

(56) References Cited

U.S. PATENT DOCUMENTS 4,883,061 A    11/1989  Zeimer
4,998,533 A     3/1991  Winkelman
(Continued)

FOREIGN PATENT DOCUMENTS

AU    2012207076    7/2012
CA       2610345   12/2006
(Continued)

OTHER PUBLICATIONS

International Search Report and Written Opinion dated Aug. 5, 2015 for application PCT/US2015/022021, filed on Mar. 23, 2015, and published as WO 2015/143435 dated Sep. 24, 2015 (Applicant—University of Iowa Research Foundation // Inventor—Abramoff, et al.) (16 pages).
(Continued)

*Primary Examiner* — Justin P. Misleh
(74) *Attorney, Agent, or Firm* — Ballard Spahr LLP

(57) ABSTRACT

Disclosed are methods and systems for analyzing data. An example method can comprise receiving volume data representative of an object. A first graph can be generated based on the volume data. The first graph can comprise nodes arranged in a Euclidean space. A deformation field can be determined based on the volume data. The deformation field can be applied to the first graph to form a second graph. The second graph can comprise nodes arranged in a non-Euclidean space. The second graph can be segmented.

22 Claims, 41 Drawing Sheets

(52) U.S. Cl.
CPC .............. *G06T 2207/10088* (2013.01); *G06T 2207/10101* (2013.01); *G06T 2207/10132* (2013.01); *G06T 2207/20072* (2013.01); *G06T 2207/20112* (2013.01); *G06T 2207/30101* (2013.01)

(56) References Cited

U.S. PATENT DOCUMENTS

| | | |
|---|---|---|
| 5,233,517 A | 8/1993 | Jindra |
| 5,270,924 A | 12/1993 | Hideshima |
| 5,303,709 A | 4/1994 | Dreher et al. |
| 5,857,030 A | 1/1999 | Gaborski et al. |
| 5,868,134 A | 2/1999 | Sugiyama et al. |
| 6,044,181 A | 3/2000 | Szeliski et al. |
| 6,053,865 A | 4/2000 | Sugiyama et al. |
| 6,104,828 A | 8/2000 | Shioiri |
| 6,276,798 B1 | 8/2001 | Gil et al. |
| 6,453,057 B1 | 9/2002 | Marshall et al. |
| 6,556,853 B1 | 4/2003 | Cabib et al. |
| 6,567,682 B1 | 5/2003 | Osterweil et al. |
| 6,674,894 B1 | 1/2004 | Parker et al. |
| 6,712,469 B2 | 3/2004 | Ando |
| 6,714,672 B1 | 3/2004 | Berestov et al. |
| 6,728,561 B2 | 4/2004 | Smith et al. |
| 6,731,782 B2 | 5/2004 | Ashton |
| 6,757,409 B2 | 6/2004 | Marshall et al. |
| 6,830,336 B2 | 12/2004 | Fransen |
| 6,845,260 B2 | 1/2005 | Liu et al. |
| 6,996,260 B1 | 2/2006 | Skands et al. |
| 7,104,958 B2 | 9/2006 | Crutchfield et al. |
| 7,206,435 B2 | 4/2007 | Fujimura et al. |
| 7,232,240 B2 | 6/2007 | Kosnik et al. |
| 7,242,810 B2 | 7/2007 | Chang |
| 7,343,032 B2 | 3/2008 | Oakley et al. |
| 7,474,775 B2 | 1/2009 | Abramoff et al. |
| 7,524,061 B2 | 4/2009 | Yan et al. |
| 7,574,028 B2 | 8/2009 | Luo et al. |
| 7,620,501 B2 | 11/2009 | Tek et al. |
| 7,712,898 B2 | 5/2010 | Abramoff et al. |
| 7,715,597 B2 | 5/2010 | Costache et al. |
| 8,140,329 B2 | 3/2012 | Zhang et al. |
| 8,180,134 B2 | 5/2012 | Wang |
| 8,194,936 B2 | 6/2012 | Abramoff et al. |
| 8,340,437 B2 | 12/2012 | Abramoff et al. |
| 8,463,065 B2 | 6/2013 | Sun et al. |
| 8,611,623 B2 | 12/2013 | Kurihara et al. |
| 8,616,702 B2 | 12/2013 | Abramoff |
| 8,634,628 B2 | 1/2014 | Inoue |
| 8,639,002 B2 | 1/2014 | Tanaka et al. |
| 8,761,473 B2 | 6/2014 | Ihara |
| 8,842,894 B2 | 9/2014 | Ihara |
| 9,307,926 B2 | 4/2016 | Begin et al. |
| 9,355,458 B2 | 5/2016 | Ihara |
| 9,679,389 B2 | 6/2017 | Ostrovsky-Berman et al. |
| 2002/0024516 A1 | 2/2002 | Chen et al. |
| 2002/0126915 A1 | 9/2002 | Lai et al. |
| 2002/0165837 A1 | 11/2002 | Zhang et al. |
| 2003/0071970 A1 | 4/2003 | Donnerhacke et al. |
| 2003/0166999 A1 | 9/2003 | Liu et al. |
| 2003/0215119 A1 | 11/2003 | Uppaluri et al. |
| 2004/0032488 A1 | 2/2004 | Harman |
| 2004/0037453 A1 | 2/2004 | Marshall et al. |
| 2004/0064057 A1 | 4/2004 | Siegel |
| 2004/0085542 A1 | 5/2004 | Soliz et al. |
| 2004/0105074 A1 | 6/2004 | Soliz et al. |
| 2006/0023990 A1 | 2/2006 | Shih et al. |
| 2006/0056727 A1 | 3/2006 | Jones et al. |
| 2006/0140446 A1 | 6/2006 | Luo et al. |
| 2007/0002275 A1 | 1/2007 | Yan et al. |
| 2007/0020795 A1 | 1/2007 | Mori et al. |
| 2007/0058865 A1 | 3/2007 | Li et al. |
| 2007/0083492 A1 | 4/2007 | Hohimer et al. |
| 2007/0092864 A1 | 4/2007 | Reinhardt et al. |
| 2007/0110298 A1 | 5/2007 | Graepel et al. |
| 2007/0122007 A1 | 5/2007 | Austin et al. |
| 2007/0183661 A1 | 8/2007 | Ei-Maleh et al. |
| 2007/0230795 A1 | 10/2007 | Abramoff et al. |
| 2007/0244396 A1 | 10/2007 | Vilser et al. |
| 2008/0100621 A1* | 5/2008 | Aharon ............... G06T 7/60 345/424 |
| 2008/0205717 A1 | 8/2008 | Reeves et al. |
| 2008/0240547 A1 | 10/2008 | Cho et al. |
| 2009/0148024 A1 | 6/2009 | Park |
| 2009/0257024 A1 | 10/2009 | Luther et al. |
| 2010/0002929 A1 | 1/2010 | Sammak et al. |
| 2010/0034457 A1 | 2/2010 | Berliner et al. |
| 2010/0061601 A1 | 3/2010 | Abramoff et al. |
| 2010/0074532 A1 | 3/2010 | Gordon et al. |
| 2010/0082692 A1 | 4/2010 | Akinyemi et al. |
| 2010/0103249 A1 | 4/2010 | Lipton et al. |
| 2010/0104150 A1 | 4/2010 | Saint Felix et al. |
| 2010/0118161 A1 | 5/2010 | Tsurumi |
| 2010/0142824 A1 | 6/2010 | Lu |
| 2010/0182406 A1 | 7/2010 | Benitez |
| 2010/0271511 A1 | 10/2010 | Ma et al. |
| 2010/0284180 A1 | 11/2010 | Popovich et al. |
| 2011/0026794 A1* | 2/2011 | Sundar ............... G06K 9/44 382/131 |
| 2011/0134221 A1 | 6/2011 | Lee et al. |
| 2011/0135172 A1 | 6/2011 | Kitamura |
| 2012/0078636 A1 | 3/2012 | Ferrucci et al. |
| 2012/0236259 A1 | 9/2012 | Abramoff et al. |
| 2012/0237094 A1 | 9/2012 | Kurihara et al. |
| 2013/0208960 A1* | 8/2013 | Reisman ............... G06T 3/4038 382/128 |
| 2014/0035901 A1* | 2/2014 | Chen ............... G06T 13/40 345/419 |
| 2015/0379708 A1 | 12/2015 | Abramoff et al. |

FOREIGN PATENT DOCUMENTS

| | | |
|---|---|---|
| CA | 2825169 | 7/2012 |
| EP | 0905509 A1 | 3/1999 |
| EP | 2665406 | 7/2012 |
| JP | 2007-097634 A | 4/2007 |
| JP | 2010-500081 A | 1/2010 |
| JP | 6005663 B2 | 10/2016 |
| WO | WO-89/05493 | 6/1989 |
| WO | WO-2005/076198 | 8/2005 |
| WO | WO-2006/023990 A2 | 3/2006 |
| WO | WO-2006/105473 | 10/2006 |
| WO | WO-2007/031818 | 3/2007 |
| WO | WO-2007/118079 | 10/2007 |
| WO | WO-2008/150840 | 12/2008 |
| WO | WO-2010/099289 A1 | 9/2010 |
| WO | 2012106677 A2 | 2/2012 |
| WO | WO-2012/078636 | 6/2012 |
| WO | WO-2012/100221 | 7/2012 |
| WO | WO-2012/100225 A1 | 7/2012 |
| WO | 2013110668 A1 | 1/2013 |
| WO | WO-2014/143891 A1 | 9/2014 |

OTHER PUBLICATIONS

International Preliminary Report on Patentability dated Sep. 29, 2016 for application PCT/US2015/022021, filed on Mar. 23, 2015, and published as WO 2015/143435 dated Sep. 24, 2015 (Applicant—University of Iowa Research Foundation // Inventor—Abramoff, et al.) (7 pages).

U.S. Appl. No. 61/420,497, filed Dec. 7, 2010, Abramoff et al (Univ. of Iowa).

U.S. Appl. No. 61/434,551, filed Jan. 20, 2011, Abramoff et al (Unov. of Iowa).

U.S. Appl. No. 61/759,201, filed Jan. 31, 2013, Abramoff et al (Univ. of Iowa).

U.S. Appl. No. 61/790,594, filed Mar. 15, 2013, Abramoff et al Univ. of Iowa).

Final Rejection dated Mar. 28, 2017 by the USPTO for U.S. Appl. No. 13/992,552, filed Jul. 25, 2013 and published as US 2015-0379708 A1 dated Dec. 31, 2015 (Applicant—University of Iowa Research Foundation) (39 pages).

(56) References Cited

OTHER PUBLICATIONS

Final Rejection dated May 12, 2017 by the USPTO for U.S. Appl. No. 14/774,801, filed Sep. 11, 2015 and published as US 2016-0035088 A1 dated Feb. 4, 2016 (Applicant—University of Iowa Research Foundation) (7 pages).
Agurto et al., "Multiscale AM-FM Methods for Diabetic Retinopathy Lesion Detection", Feb. 2010, Medical Imaging, IEEE Transactions on, vol. 29, No. 2, 502-512.
Barraga et al., "Automatic system for diabetic retinopathy screening based on AM-FM, partial least squares, and support vector machines", Apr. 2010, Biomedical Imaging: From Nano to Macro, 2010 IEEE International Symposium on, 1349-1352.
Chrastek et al,"Automated Calculation of Retinal Arteriovenous Ratio for Detection and Monitoring of Cerebrovascular Disease Based on Assessment of Morphological Changes of Rentinal Vascular System" MVA 2002 Proceedings of IAPR Workshop on Machine Vision Applications, Dec. 13, 2002, pp. 240-243 (4 Pages).
European Search Report dated Mar. 16, 2016 by the European Patent Office for Application No. 12736290.3, which was filed on Jan. 20, 2011, and published as 2665406, dated Nov. 27, 2013 (Inventor—Michael D. Abramoff et al; Applicant—University of Iowa) (11 Pages).
Final Rejection dated Nov. 13, 2015 by the U.S. Patent and Trademark Office for U.S. Appl. No. 13/992,552, filed Jul. 25, 2013 and published as US-2013-0301889-A1 dated Nov. 4, 2013 (Applicant—University of Iowa Research Foundation; Inventor—Michael D. Abramoff, et al.) (32 Pages).
Final Rejection dated Nov. 9, 2016 by the U.S. Patent and Trademark Office for U.S. Appl. No. 13/355,386, filed Jan. 20, 2012 and published as US 2012-0236259 A1 dated Sep. 20, 2012 (Applicant—University of Iowa Research Foundation; Inventor—Michael D. Abramoff et al) (14 Pages).
Final Rejection dated Mar. 11, 2014 by the U.S. Patent and Trademark Office for U.S. Appl. No. 13/355,386, filed Jan. 20, 2012 and published as US-2012-0236259-A1 dated Sep. 20, 2012 (Applicant—University of Iowa Research Foundation; Inventor—Michael D. Abramoff, et al.) (17 Pages).
Final Rejection dated Jun. 23, 2015 by the U.S. Patent and Trademark Office for U.S. Appl. No. 13/355,386, filed Jan. 20, 2012 and published as US-2012-0236259-A1 dated Sep. 20, 2012 (Applicant—University of Iowa Research Foundation; Inventor—Michael D. Abramoff, et al.) (17 Pages).
Frangi et al, "Multiscale Vessel Enhancement Filtering", Medical Image Computing and Computer-Assisted Intervention—MICCAI'98 Lecture Notes in Computer Science vol. 1496, 1998, 130-137.
International Preliminary Report on Patentability dated Jun. 12, 2013 by the International Searching Authority for Application No. PCT/US2011/63537 , which was filed on Dec. 6, 2011 and published as WO 2012/078636 dated Jun. 14, 2012 (Applicant—University of Iowa Research Foundation) (11 Pages).
International Preliminary Report on Patentability dated Jul. 23, 2013 by the International Searching Authority for Application No. PCT/US2012/022111, which was filed on Jan. 20, 2012 and published as WO/2012/100221 dated Jul. 26, 2012 (Applicant—University of Iowa Research Foundation) (7 Pages).
International Preliminary Report on Patentability dated Aug. 4, 2015 by the International Searching Authority for Application No. PCT/US2014/014298, which was filed on Jan. 31, 2014 and published as WO/2014/158345 dated Oct. 2, 2014 (Applicant—University of Iowa Research Foundation) (6 Pages).
International Preliminary Report on Patentability dated Sep. 15, 2015 by the International Searching Authority for Application No. PCT/US2014/28055, which was filed on Mar. 14, 2014 and published as WO 2014/143891 dated Sep. 18, 2014 (Applicant—University of Iowa Research Foundation) (5 Pages).
International Search Report and Written Opinion dated Apr. 3, 2012 by the International Searching Authority for Application No. PCT/US2011/63537 , which was filed on Dec. 6, 2011 and published as WO 2012/078636 dated Jun. 14, 2012 (Applicant—University of Iowa Research Foundation) (11 Pages).
International Search Report and Written Opinion dated May 25, 2012 by the International Searching Authority for Application No. PCT/US2012/022111, which was filed on Jan. 20, 2012 and published as WO/2012/100221 dated Jul. 26, 2012 (Applicant—University of Iowa Research Foundation) (7 Pages).
International Search Report and Written Opinion dated Aug. 15, 2014 by the International Searching Authority for Application No. PCT/US2014/28055, which was filed on Mar. 14, 2014 and published as WO 2014/143891 dated Sep. 18, 2014 (Applicant—University of Iowa Research Foundation) (6 Pages).
International Search Report and Written Opinion dated Sep. 4, 2014 by the International Searching Authority for Application No. PCT/US2014/014298, which was filed on Jan. 31, 2014 and published as WO/2014/158345 dated Oct. 2, 2014 (Applicant—University of Iowa Research Foundation) (7 Pages).
Klein, Barbara E. et al "Cardiovascular Disease, Mortality, and Retinal Microvascular Characteristics in Type 1 Diabetes" Arch Intern Med. Sep. 27, 2004;164(17):1917-24.
Kondermann, et al "Blood Vessel Classification into Arteries and Veins in Retinal Images" Proc. of SPIE 6512 (2007): pp. 651247-1 to 651247-9, Print. (9 Pages).
Muramatsu et al, "Automated selection of major arteries and veins for measurement of arteriolarto—venular diameter ratio on retinal fundus images" Computerized medical imaging and graphics, vol. 35, No. 6, Mar. 16, 2011 pp. 4 72-480 (9 Pages).
Niemeijer et al; "Automatic determination of the atery vein ratio in retinal images" Medical Imaging 2002, vol. 7624, Mar. 4, 2010 (1 0 Pages).
Non Final Rejection dated Jan. 27, 2017 by the U.S. Patent and Trademark Office for U.S. Appl. No. 14/764926, filed Jul. 30, 2015 and published as US 2015-0379708 A1 dated Dec. 31, 2015 (Applicant—University of Iowa Research Foundation; Inventor—Michael D. Abramoff et al) (9 Pages).
Non Final Rejection dated Nov. 4, 2016 by the U.S. Patent and Trademark Office for U.S. Appl. No. 14/774,801, filed Sep. 11, 2015 and published as US 2016-0035088 A1 dated Feb. 4, 2016 (Applicant—University of Iowa Research Foundation; Inventor—Michael D. Abramoff et al) (6 Pages).
Non Final Rejection dated Feb. 6, 2015 by the U.S. Patent and Trademark Office for U.S. Appl. No. 13/355,386, filed Jan. 20, 2012 and published as US-2012-0236259-A1 dated Sep. 20, 2012 (Applicant—University of Iowa Research Foundation; Inventor—Michael D. Abramoff, et al.) (13 Pages).
Non Final Rejection dated Mar. 30, 2016 by the U.S. Patent and Trademark Office for U.S. Appl. No. 13/355,386, filed Jan. 20, 2012 and published as US-2012-0236259-A1 dated Sep. 20, 2012 (Applicant—University of Iowa Research Foundation; Inventor—Michael D. Abramoff, et al.) (12 Pages).
Non Final Rejection dated May 11, 2015 by the U.S. Patent and Trademark Office for U.S. Appl. No. 13/992,552, filed Jul. 25, 2013 and published as US-2013-0301889-A1 dated Nov. 4, 2013 (Applicant—University of Iowa Research Foundation; Inventor—Michael D. Abramoff, et al.) (31 Pages).
Non Final Rejection dated Jul. 11, 2016 by the U.S. Patent and Trademark Office for U.S. Appl. No. 13/992,552, filed Jul. 25, 2013 and published as US-2013-0301889-A1 dated Nov. 4, 2013 (Applicant—University of Iowa Research Foundation; Inventor—Michael D. Abramoff, et al.) (37 Pages).
Non Final Rejection dated Sep. 19, 2013 by the U.S. Patent and Trademark Office for U.S. Appl. No. 13/355,386, filed Jan. 20, 2012 and published as US-2012-0236259-A1 dated Sep. 20, 2012 (Applicant—University of Iowa Research Foundation; Inventor—Michael D. Abramoff, et al.) (16 Pages).
Non Final Rejection dated Nov. 4, 2016 to the U.S. Patent and Trademark Office for U.S. Appl. No. 14/774,801, filed Sep. 11, 2015 and published as US 2016-0035088 A1 dated Feb. 4, 2016 (Applicant—University of Iowa Research Foundation; Inventor—Michael D. Abramoff, et al.) (6 Pages).
Preliminary Amendment dated Jun. 19, 2012 to the U.S. Patent and Trademark Office for U.S. Appl. No. 13/355,386, filed Jan. 20, 2012

(56) References Cited

OTHER PUBLICATIONS and published as US-2012-0236259-A1 dated Sep. 20, 2012 (Applicant—University of Iowa Research Foundation; Inventor—Michael D. Abramoff, et al.) (3 Pages).
Preliminary Amendment dated Jun. 7, 2013 to the U.S. Patent and Trademark Office for U.S. Appl. No. 13/992,552, filed Jul. 25, 2013 and published as US-2013-0301889-A1 dated Nov. 4, 2013 (Applicant—University of Iowa Research Foundation; Inventor—Michael D. Abramoff, et al.) (8 Pages).
Preliminary Amendment dated Jul. 30, 2015 to the U.S. Patent and Trademark Office for U.S. Appl. No. 14/764,926, filed Jul. 30, 2015 and published as US 2015-0379708 A1 dated Dec. 31, 2015 (Applicant—University of Iowa Research Foundation; Inventor—Michael D. Abramoff, et al.) (4 Pages).
Preliminary Amendment dated Sep. 11, 2015 to the U.S. Patent and Trademark Office for U.S. Appl. No. 14/774,801, filed Sep. 11, 2015 and published as US 20160035088 A1 dated Feb. 4, 2016 (Applicant—University of Iowa Research Foundation; Inventor—Michael D. Abramoff, et al.) (4 Pages).
Quellec et al., "Optimal Filter Framework for Automated, Instantaneous Detection of Lesions in Retinal Images", (2010) Medical Imaging, IEEE Transactions on, vol. 30, No. 2, 523-533.
Response to Final Rejection dated Aug. 24, 2015 to the U.S. Patent and Trademark Office for U.S. Appl. No. 13/355,386, filed Jan. 20, 2012 and published as US-2012-0236259-A1 dated Sep. 20, 2012 (Applicant—University of Iowa Research Foundation; Inventor—Michael D. Abramoff, et al.) (11 Pages).
Response to Non Final Rejection dated Oct. 12, 2015 to the U.S. Patent and Trademark Office for U.S. Appl. No. 13/992,552, filed Jul. 25, 2013 and published as US-2013-0301889-A1 dated Nov. 4, 2013 (Applicant—University of Iowa Research Foundation; Inventor—Michael D. Abramoff, et al.) (12 Pages).
Response to Non Final Rejection dated Dec. 19, 2013 to the U.S. Patent and Trademark Office for U.S. Appl. No. 13/355,386, filed Jan. 20, 2012 and published as US-2012-0236259-A1 dated Sep. 20, 2012 (Applicant—University of Iowa Research Foundation; Inventor—Michael D. Abramoff, et al.) (10 Pages).
Response to Non Final Rejection dated May 6, 2015 to the U.S. Patent and Trademark Office for U.S. Appl. No. 13/355,386, filed Jan. 20, 2012 and published as US-2012-0236259-A1 date Sep. 20, 2012 (Applicant—University of Iowa Research Foundation; Inventor—Michael D. Abramoff, et al.) (11 Pages).
Response to Non Final Rejection dated Sep. 30, 2016 to the U.S. Patent and Trademark Office for U.S. Appl. No. 13/355,386, filed Jan. 20, 2012 and published as US-2012-0236259-A1 dated Sep. 20, 2012 (Applicant—University of Iowa Research Foundation; Inventor—Michael D. Abramoff, et al.) (9 Pages).
Sharrett, A. Richey et al. Retinal Arteriolar Diameters and Elevated Blood Pressure. American Journal of Epidemiology 150.3.
Staal, J. et al. "Ridge-Based Vessel Segmentation in Color Images of the Retina." IEEE Transactions on Medical Imaging 23.4 (2004): 501-509.
Tuytelaars, et al., "Matching widely separated views based on affine invariant regions." International journal of computer vision 59.1 (Aug. 2004) (pp. 61-85).
Wong et al, "Computer-Assisted Measurement of Retinal Vessel Diameters in the Beaver Dam Eye Study Methodology, Correlation Between Eyes, and Effect of Refractive Errors" Ophthalmology, vol. 111, No. 6, Jun. 1, 2004, pp. 1183-1190 (8 Pages).
Lee et al., "Retinal atlas statistics from color fundus images." Medical Imaging: Image Processing. 2010 (10 pages).
Non Final Rejection dated Dec. 11, 2017 by the USPTO Office for U.S. Appl. No. 13/992,552, filed Jul. 25, 2013 and published as US 2013-0301889 A1 dated Nov. 14, 2013 (Applicant—Michael D. Abramoff) (33 pages).
Non Final Rejection dated Nov. 17, 2017 by the USPTO Office for U.S. Appl. No. 14/774,801, filed Sep. 21, 2015 and published as US 2016-0035088 A1 dated Feb. 4, 2016 (Applicant—Michael D. Abramoff) (8 pages).
Boroujeni et al., Coronary Artery Center-line Extraction Using Second Order Local Features. Comput Math Methods Med. 2012 (21 pages).
Szymczak et al., Coronary Vessel Trees from 3D Imagery: a Topographical Approach. Med Image Anal. 2006; 10(4):548-59.
Notice of Allowance dated Jul. 11, 2018 by the U.S. Patent and Trademark Office for U.S. Appl. No. 13/992,552, filed Jul. 25, 2013 and published as US 2013/0301889 dated Nov. 14, 2013 (Inventor—Michael Abramoff et al.; Applicant—University of Iowa Research Foundation) (8 pages).
Final Office Action dated Jul. 23, 2018 by the U.S. Patent and Trademark Office for U.S. Appl. No. 14/774,801, filed Sep. 21, 2015 and published as US 2016/0035088 dated Feb. 4, 2016 (Inventor—Abramoff et al.; Applicant—University of Iowa Research Foundation et al.) (8 pages).

* cited by examiner

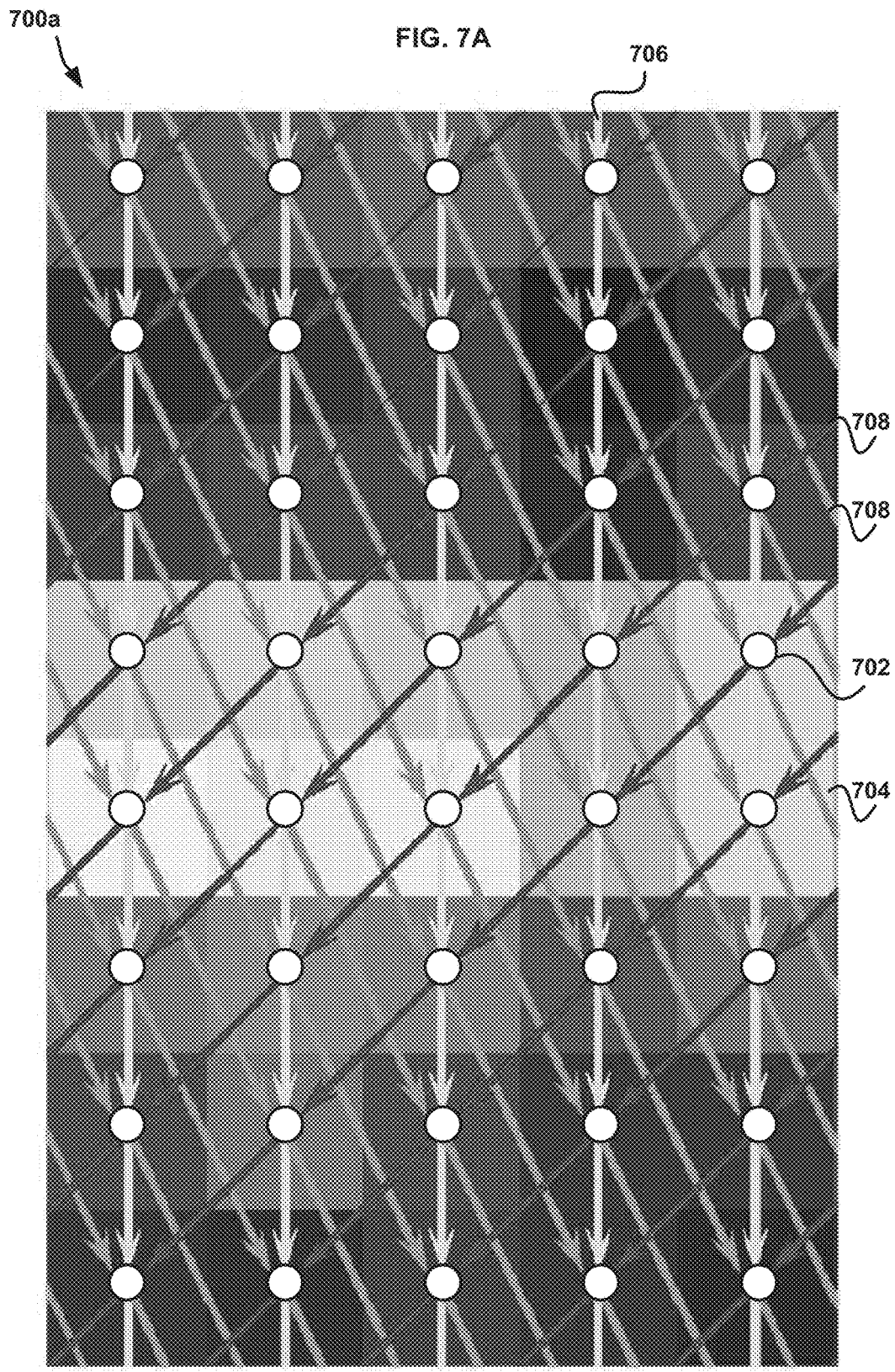

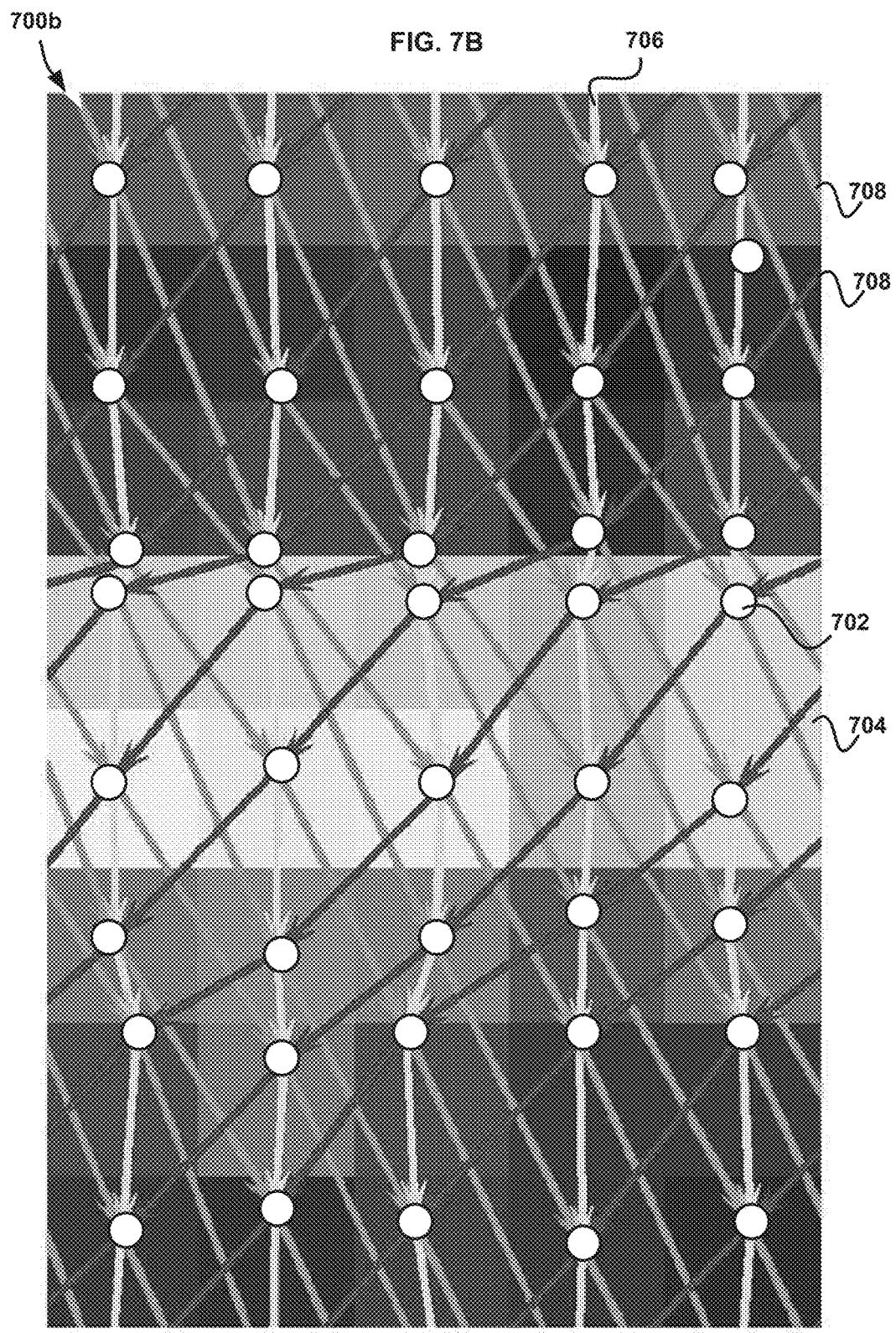

1502  1504  1506

METHODS AND SYSTEMS FOR IMAGE ANALYSIS USING NON-EUCLIDEAN DEFORMED GRAPHS

CROSS-REFERENCE TO RELATED APPLICATIONS

This application is a national phase filing of International patent application No. PCT/US2015/022021, filed on Mar. 23, 2015, which claims the benefit of U.S. provisional patent application No. 61/968,713, filed Mar. 21, 2014, each reference is herein incorporated by reference in its entirety.

STATEMENT OF GOVERNMENT FUNDING

This invention was made with government support under CCF-0844765 and CCF-1318996 awarded by the National Science Foundation, R01 EY019112 and R01 EY018853 awarded by the National Institutes of Health, and I01 CX000119 awarded by the Department of Veteran Affairs. The government has certain rights in the invention.

BACKGROUND

A graph search is attractive for quantitative analysis of volumetric medical images, especially for layered tissues, because a graph search allows globally optimal solutions in low-order polynomial time. However, because the volume data can be represented as nodes in an orthogonal graph in Euclidean space, segmentation may not achieve greater precision than a single unit, or distance between two adjoining nodes, and partial volume effects may be ignored. These and other shortcomings are addressed by the present disclosure.

SUMMARY

It is to be understood that both the following general description and the following detailed description are exemplary and explanatory only and are not restrictive, as claimed. Provided are methods and systems for analyzing data. An example method can comprise receiving volume data representative of an object. A first graph can be generated based on the volume data. The first graph can comprise nodes arranged in a Euclidean space. A deformation field can be determined based on the volume data. The deformation field can be applied to the first graph to form a second graph. The second graph can comprise nodes arranged in a non-Euclidean space. The second graph can be segmented.

In another aspect, an example method can comprise receiving intensity data representative of an object. A graph of the object can be generated. The graph can be deformed to more accurately represent the intensity data. At least one surface of the object can be identified based on the deformed graph. A representation of the at least one surface of the object can be provided.

In another aspect, an example system can comprise a memory having computer-executable instructions encoded thereon. The system can comprise at least one processor functionally coupled to the memory and configured, by the computer-executable instructions, for, receiving volume data representative of an object, generating a first graph based on the volume data, determining a deformation field based on the volume data, applying the deformation field to the first graph to form a second graph, and segmenting the graph. The first graph can comprise nodes arranged in a Euclidean space. The second graph can comprise nodes arranged in a non-Euclidean space.

In another aspect, an example system can comprise a memory having computer-executable instructions encoded thereon. The system can comprise at least one processor functionally coupled to the memory and configured, by the computer-executable instructions, for, receiving intensity data representative of an object, generating a graph of the object, deforming the graph to more accurately represent the intensity data, identifying at least one surface of the object based on the deformed graph, and providing a representation of the at least one surface of the object.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems:

FIG. 4A illustrates a single boundary delineated in one B-scan of an OCT volume;

FIG. 7A shows a conventional graph structure;

FIG. 7B shows a Non-Euclidean deformed graph model;

DETAILED DESCRIPTION

Figure 1:
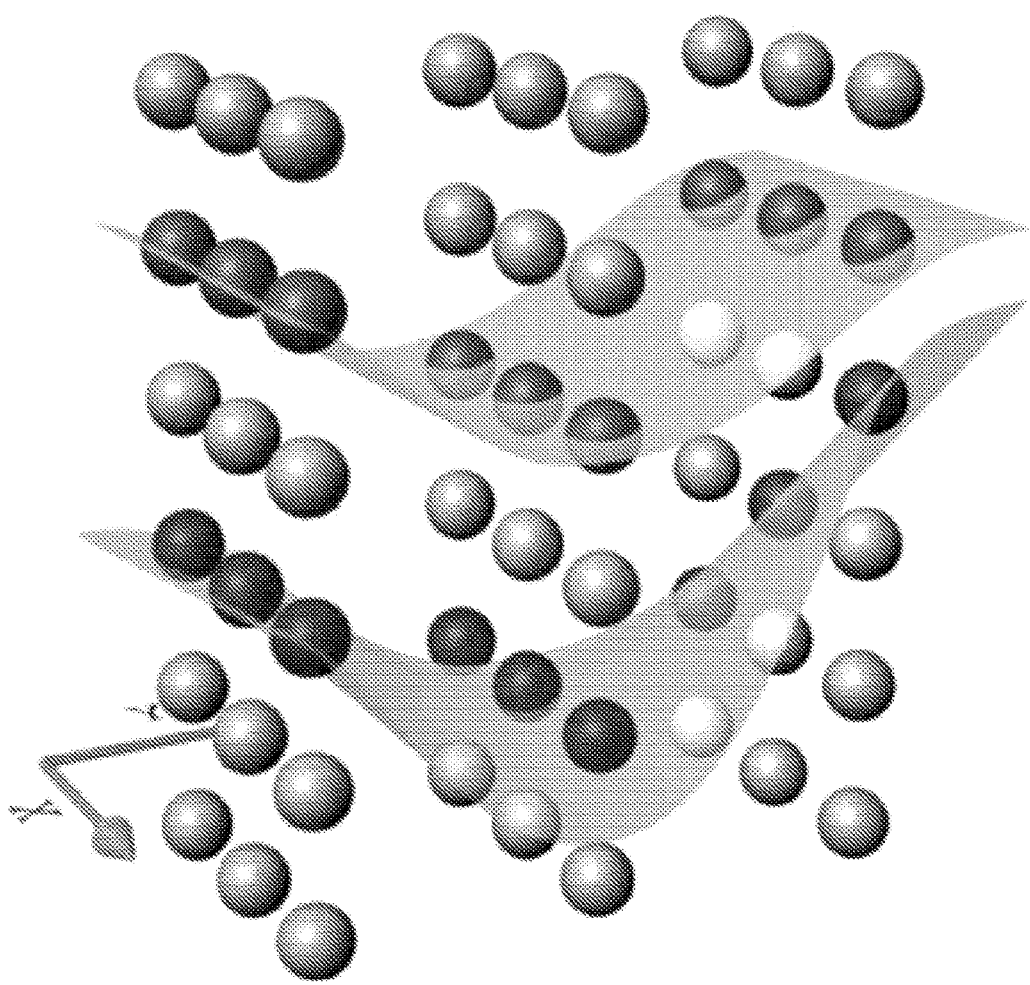
FIG. 1 illustrates an example of graph and surface orientation in layered tissue segmentation.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

A graph search is attractive for quantitative analysis of volumetric medical images, especially for layered tissues, because a graph search allows globally optimal solutions in low-order polynomial time. However, because the volume data can be represented as nodes in an orthogonal graph in Euclidean space, segmentation may not achieve greater precision than a single unit, or distance between two adjoining nodes, and partial volume effects may be ignored. The present methods and systems involve generating a graph representation in non-Euclidean space, thus allowing non-equidistant spacing between nodes on any dimension, so that subvoxel accurate segmentation becomes possible. If the number of nodes in the graph is unchanged, all the advantages of graph search, including global optimality and computational efficiency remain. The present methods and systems can calculate a deformation field from the volume data, adaptively changing regional node density so that node density varies with the inverse of the expected cost. The present methods and systems are discussed with regards to optical coherence tomography (OCT) images of the retina and 3-D magnetic resonance imaging (MRI) dataset of the artery wall. However, other imaging modalities and tissues/objects can be contemplated. The present methods and systems allow both higher precision tissue measurement from medical volume data acquired with the same hardware and measurement at the same precision with lower resolution more cost-effective imaging equipment. The present methods and systems are readily extensible to higher dimensions.

Object segmentation can be used in image understanding and object recognition, especially in quantitative analysis of volumetric medical images, general pattern recognition, object segmentation from various imaging modalities, including CT, MRI, ultrasound, laser, radar, and the like. Discussion herein will describe medical images but imaging in other fields using object segmentation are considered. Outside of medical imaging, it can be used in any application where multidimensional data needs to be separated into different surfaces, for example 3D computer vision, seismic imaging, construction, ocean hydrodynamic imaging, LIDAR. Organ tissues can be organized in layers, and to segment the boundaries or surfaces of layered objects, the segmentation problem can be transformed into the problem of computing a minimum closed set in a node-weighted directed graph. If organ tissues are not organized in layers, the organ tissue can be unwrapped into layered structures using image transformation. Every node represents a single voxel and the optimal surface corresponds to the upper envelope of the minimum closed set of nodes (e.g., see FIG. 1). FIG. 1 illustrates an example of graph and surface orientation in layered tissue segmentation. Because volume data is represented as an orthogonal matrix of intensities in Euclidean space, the nodes can be placed in Euclidean space, and the surface segmentation may not achieve greater precision than a single unit, or distance between two adjoining nodes. However, higher segmentation accuracy than a single unit can help in better diagnosis and treatment of disease, and equal segmentation accuracy with lower resolution imaging hardware can help in more cost-effective imaging.

Graph techniques, a generalization of 2D path-based segmentation, can provide globally optimal solutions with respect to a cost function for surface segmentation in three-dimensional volumes in polynomial time. Graph techniques can allow incorporation of various feasibility constraints and regional information for the simultaneous segmentation of multiple surfaces. Additional terms in the cost function can make it possible to penalize local shape or surface distance changes by learning the expected model during a training process. Unfolding techniques can be used to segment objects with complex shapes, such as knee bone, cartilage, heart, pulmonary airway, vascular trees, retinal lesions and retinal vessels. However, all techniques can use a graph in Euclidean space, thus limiting segmentation precision to a single unit.

Volumetric medical images can be formed by discretizing into a voxel the continuous intensity function measured by each sensor, thus resulting in partial volume effects. Partial volume effects can contain additional information that can potentially be exploited by graph techniques. However, partial volume effects are ignored when the intensity in voxels is converted into nodes in a graph in Euclidean space. By generalizing graphs to include non-Euclidean space, e.g., allowing non-equidistant spacing between nodes on any dimension, this discarded information (e.g., partial volume effects) can be used, while all the advantages of graph techniques sketched above can be retained, including global optimality and computational efficiency. Such a graph search can be defined as non-Euclidean graph search.

Specifically, a non-Euclidean deformation can be applied to the graph using a displacement field obtained directly from the volume data. This principle is sketched in FIG. 2A and FIG. 2B in a simplified 2D example. The density of nodes thus increases at regions where transitions of image properties are more likely to occur. Overall the complexity of the graph structure in terms of the number of nodes and arcs is unchanged after deformation, so that memory requirements and running time are unchanged except for the computation of the deformation field. Effectively, the deformation field adaptively changes the regional node density so that this is higher in regions where the target surface is expected to pass through, and lower in the remaining region, while retaining the overall node density.

Figure 2A:
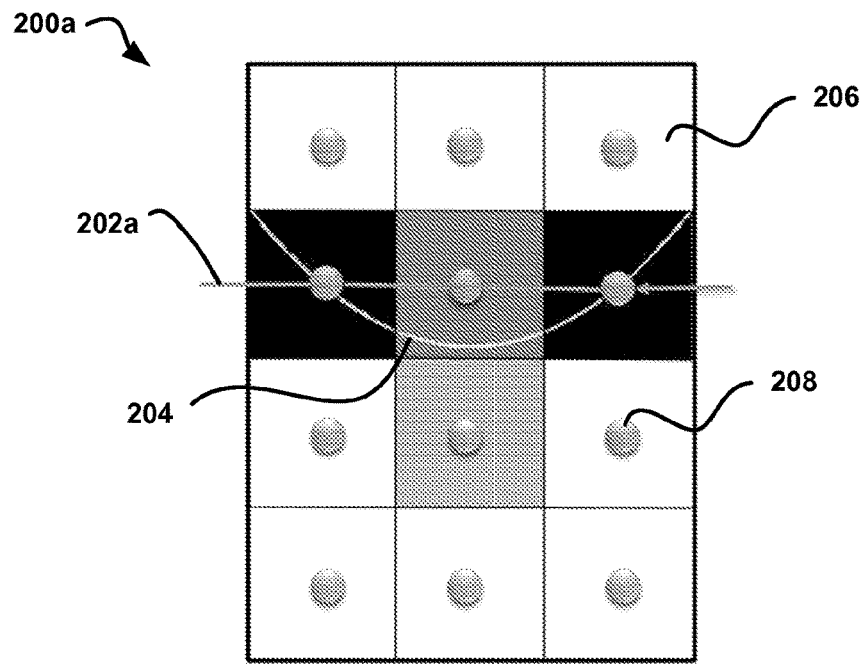
FIG. 2A shows a graph in standard Euclidean space.
Figure 2B:
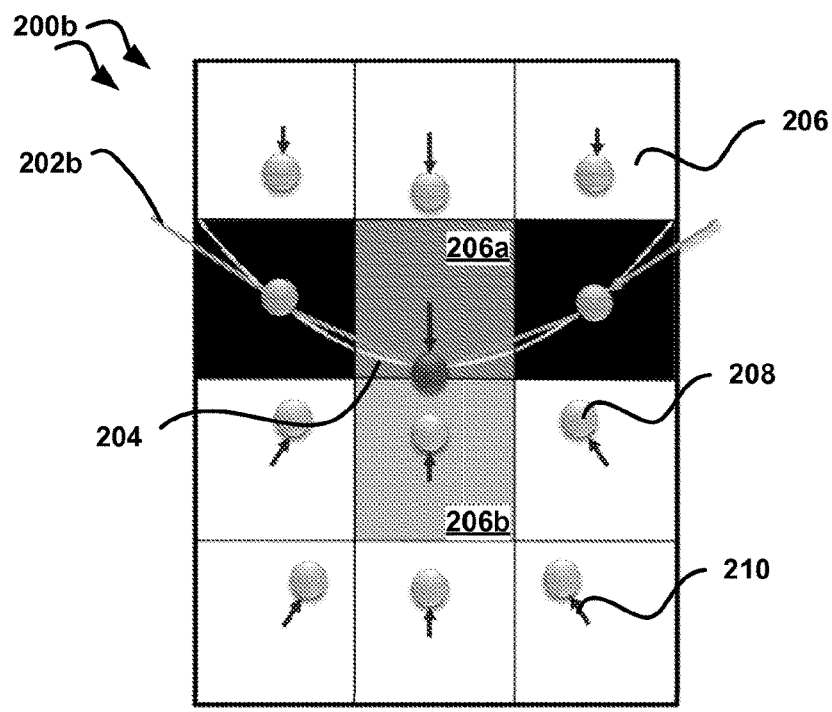
FIG. 2B illustrates a Non-Euclidean graph.

Graphs in Non-Euclidean space allow surface localization with subvoxel accuracy. For example, FIG. 2A shows a graph 200a in standard Euclidean space that allows a graph search to find the lowest cost path 202a (darkest voxel intensity) with voxel accuracy, compared to the true surface 204. Each square represents a voxel 206 and each sphere represents a node 208 within a node's respective voxel 206. FIG. 2B illustrates a Non-Euclidean graph 200b that allows the true surface 204 to be segmented through the lowest cost path 202b with subvoxel accuracy, after the deformation field (arrows 210) derived from the volume data is applied to each node 208. Note a partial volume effect of the two central voxels 206a and 206b compared to their neighboring voxels, indicating that the actual center of low tissue intensity is below the center of the upper dark voxel 206a, as also indicated by the true surface 204.

The present disclosure introduces a non-Euclidean graph novel approach, and validates the non-Euclidean graph approach's increased accuracy by comparing accurately segmented high resolution volumetric surfaces, the reference standard, to both the non-Euclidean graph approach as well as to standard graph search segmentation of down-sampled volumes in OCT volumes of the retina and MRI of the carotid vessel wall. The presented methods and systems using a non-Euclidean approach provide superior segmentation accuracy over conventional graph search techniques.

As an example, the signed error of region bounded by two coupled terrain-like surfaces in ten OCT scans can be significantly decreased from 0.04±0.44 voxels using conventional graph search to −0.01±0.31 voxels using the present methods and systems. The unsigned error can be significantly decreased from 0.36±0.26 voxels to 0.18±0.17 voxels.

In one aspect, a non-Euclidean graph search can be performed. For example, a Euclidean space graph can be generated. The Euclidian space graph can be a representation of layered tissues, lesions, combinations thereof, and the like. Let I be a given 3D volumetric image with a size of n=X×Y×Z. For each (x, y) pair, $0 \leq x < X$ and $0 \leq y < Y$, the voxels with different z-coordinates, that is, the voxel subset $\{I(x, y, z) | 0 \leq z < Z\}$, forms a voxel-column parallel to the z-axis, denoted by p(x, y). Two voxel-columns are neighboring if their (x, y)-coordinates satisfy some neighborhood condition. For example, under the 4-neighboring setting, the voxel-column p(x, y) is neighboring to the voxel-column q(x', y') if $|x-x'|+|y-y'|=1$. Henceforth, a model of the 4-neighboring setting is used; this simple model can be easily extended to other neighborhood conditions. Each of the target terrain-like surfaces can contain one and only one voxel in each column of I (FIG. 1).

The feasibility of the target surfaces can be governed by the surface smoothness and separation constraints. The surface smoothness constraint can be specified by two smoothness parameters, $\Delta_x$ and $\Delta_y$, which define the maximum allowed change in the z-coordinate of a surface along each unit distance change in the x and y dimensions, respectively. If I(x, y, z') and I(x+1, y, z'') (resp., I(x, y+1, z'')) are two (neighboring) voxels on a feasible surface, then $|z'-z''| \leq \Delta_x$ (resp., $|z'-z''| \leq \Delta_y$).

In multiple surface detection, the surface separation constraint can specify the minimum and maximum distances along the z-dimension between any pair of the target surfaces of interest. Each voxel I(x, y, z) can have a real-valued cost $c_i(x, y, z)$ for each sought surface $S_i$, which is inverse to the likelihood that the voxel is on the surface. For a given integer $\kappa > 0$, the surface segmentation problem seeks to identify a set of κ surfaces with minimum total cost by summing the costs associated with all voxels on all sought surfaces.

A standard Euclidean space graph search segmentation approach is explained as follows. The surface segmentation problem in 3D volumetric images I(X, Y, Z) can be formulated as computing a minimum closed set in a node-weighted directed graph. For single surface segmentation (i.e. κ=1), the graph G=(V, E) can comprise a set of nodes V and a set of arcs E connecting pairs of nodes. Every node v(x, y, z) can be created from exactly one voxel of I(x, y, z). The subset of nodes corresponding to a voxel-column p(x, y) of voxels in I can form a node-column, denoted by Col(p). Arcs connecting two neighboring nodes on the same column are intra-column arcs while those connecting two nodes from neighboring columns are inter-column arcs. The intra-column arcs pointing downward can enforce the constraint that a feasible surface S intersects each voxel-column only once. The inter-column arcs can impose smoothness constraints between neighboring voxel-columns.

A closed set can be a subset of nodes which have no arcs leaving the set. Each non-empty closed set can uniquely define a feasible surface S in I(X, Y, Z). In order to find a minimum closed set C whose total cost is the summation of costs of all nodes contained in the region bounded by surface S, the weight of each node v(x, y, z) can be assigned as follows:

$$w(x, y, z) = \begin{cases} c(x, y, z) & \text{if } z = 0, \\ c(x, y, z) - c(x, y, z-1) & \text{otherwise.} \end{cases} \quad (1)$$

By solving the minimum closed set problem, each node can get a binary label 1 indicating whether a node is contained in C. The upper envelope of C can correspond exactly to the optimal surface with the same minimum total cost in the original graph.

For simultaneously segmenting κ interrelated surfaces, a similar graph structure can be duplicated κ times with respect to a particular surface. The costs assigned to each sub-graph reflect whether the data can favor the nodes belonging to that certain surface. Inter-sub-graph arcs can be created to connect two nodes from corresponding columns of different sub-graphs, imposing neighboring surface separation constraints. The total cost can be the summation of the cost in κ sub-graphs.

Figure 3:
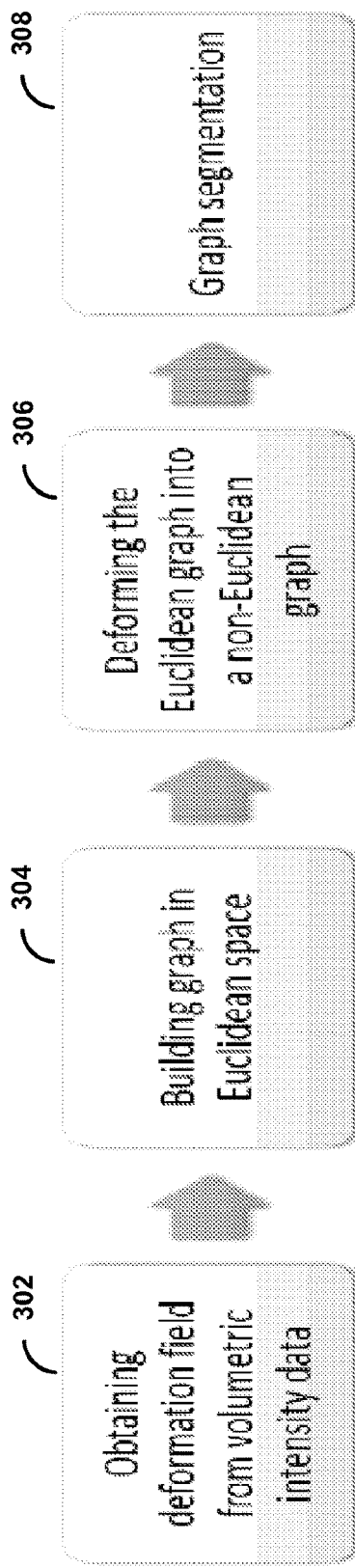
FIG. 3 is a flowchart illustrating steps in a Non-Euclidean graph search.

FIG. 3 is a flowchart illustrating steps in a Non-Euclidean graph search. At step 302, a deformation field can be determined (e.g., obtained) from volumetric intensity data. At step 304, a graph can be generated (e.g., built) in Euclidean space (e.g., as described herein). At step 306, the Euclidean space graph can be deformed into a non-Euclidean graph using the deformation field. At step 308, graph segmentation can be performed (e.g., as described herein)

In one aspect, a deformation field can be determined from volumetric data as follows. A shift of evenly distributed voxels to a deformed graph space, defined as a non-Euclidean deformation field F(x, y, z) acting on the center of each voxel (x, y, z) can be defined as follows:

$$(x', y', z') = (x, y, z) + \lambda F(x, y, z) \quad (2)$$

where λ represents a normalization factor. For the worst case, the error introduced by a voxel can be equal to half of the voxel size δ. Therefore, F(x, y, z) can be normalized such that the maximum deformation is equal to δ:

$$\lambda = 0.5 \cdot \delta / \max(\|F(x, y, z)\|) \quad (3)$$

The deformation field F(x, y, z) can be defined in (real) voxel coordinates. The deformation field F(x, y, z) can be calculated from the negative diffusion of the gradient vectors of cost w(x, y, z) derived from intensity volume data I(X, Y, Z):

$$F(x, y, z) = -\nabla[G_\sigma(x, y, z) * w(x, y, z)] \quad (4)$$

where $G_\sigma(x, y, z)$ is a regularization imposed by a 3D Gaussian kernel with standard deviation of σ, the symbols ∇ and * represent the gradient and convolution operators respectively. It should be noted that other methods can be used for obtaining F(x, y, z). For example, the gradient vector flow field (GVF) can be used. As a feature-preserving diffusion of the gradient, GVF can be defined as the vector field that minimizes the following energy function:

$$F(x, y, z) = \arg\min \Sigma[\mu \|\nabla I(x, y, z)\|^2 + \|\nabla w(x, y, z)\|^2 \|F(x, y, z) - \nabla w(x, y, z)\|^2] \quad (5)$$

The parameter μ regularizes the importance of the two terms contributing to the energy function.

Figure 4B:
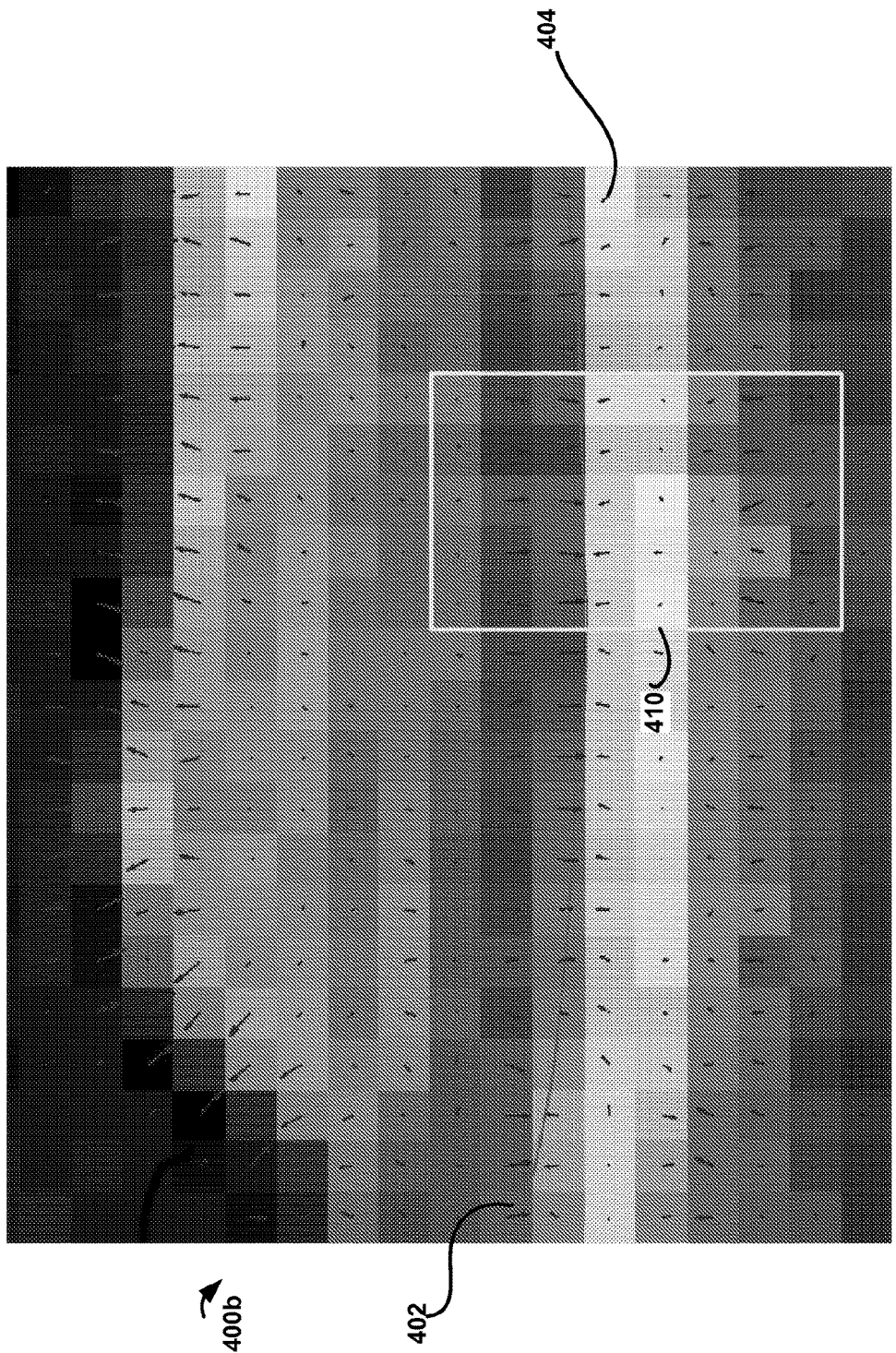
FIG. 4B illustrates the 2D deformation field of the re-sampled B-scan indicating the actual boundary location within each voxel under partial volume effects.

FIG. 4A and FIG. 4B illustrate a 2D deformation field of an example B-scan (cross-sectional scan) in an OCT volume. FIG. 4A illustrates a single boundary delineated in one B-scan of an OCT volume. FIG. 4B illustrates the 2D deformation field of the re-sampled B-scan indicating the actual boundary location within each voxel under partial volume effects. As a further explanation, FIG. 4A and FIG. 4B show an example deformation field in a single B-scan of an OCT volume, calculated according to Eq. 4. In FIG. 4A, a single boundary S of high resolution image H(x, y) 400*a* (440×368 pixels) can be delineated by a line 402*a*. The B-scan H(x, y) can be down-sampled to I(x, y) by ten times to 37×44 pixels to mimic the imaging and discretization process of the continuous tissue intensity function. The boundary surface S can be mapped from the high resolution to its location in the re-sampled B-scan I(x, y) 400*b* of FIG. 4B in lower resolution. Part of a zoomed-in view of I(x, y) 400*b* is shown in FIG. 4B with its 2D deformation vectors F(x, y) displayed as arrows 404 starting from the center of each pixel (x, y).

Figure 5A:
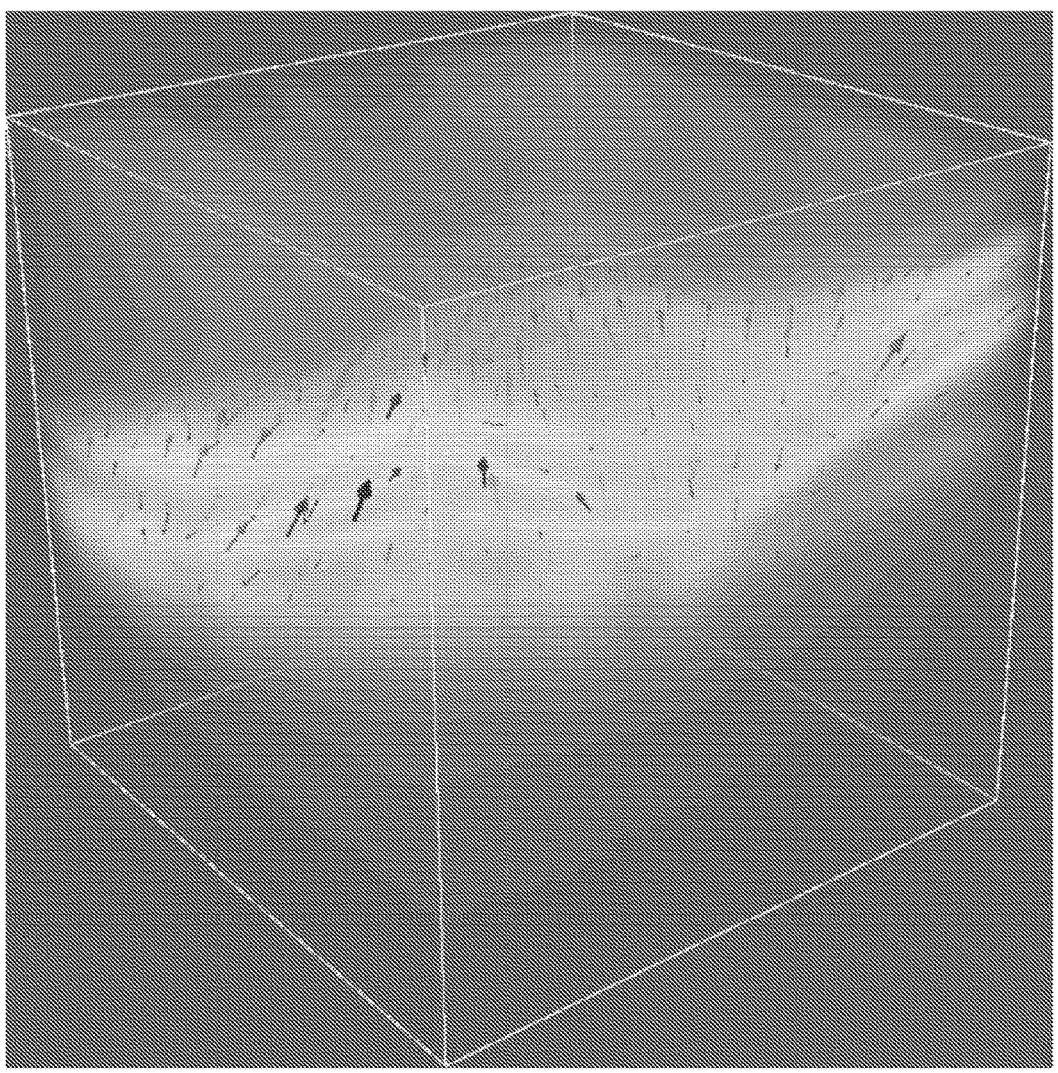
FIG. 5A illustrates a deformation field before regularization.
Figure 5B:
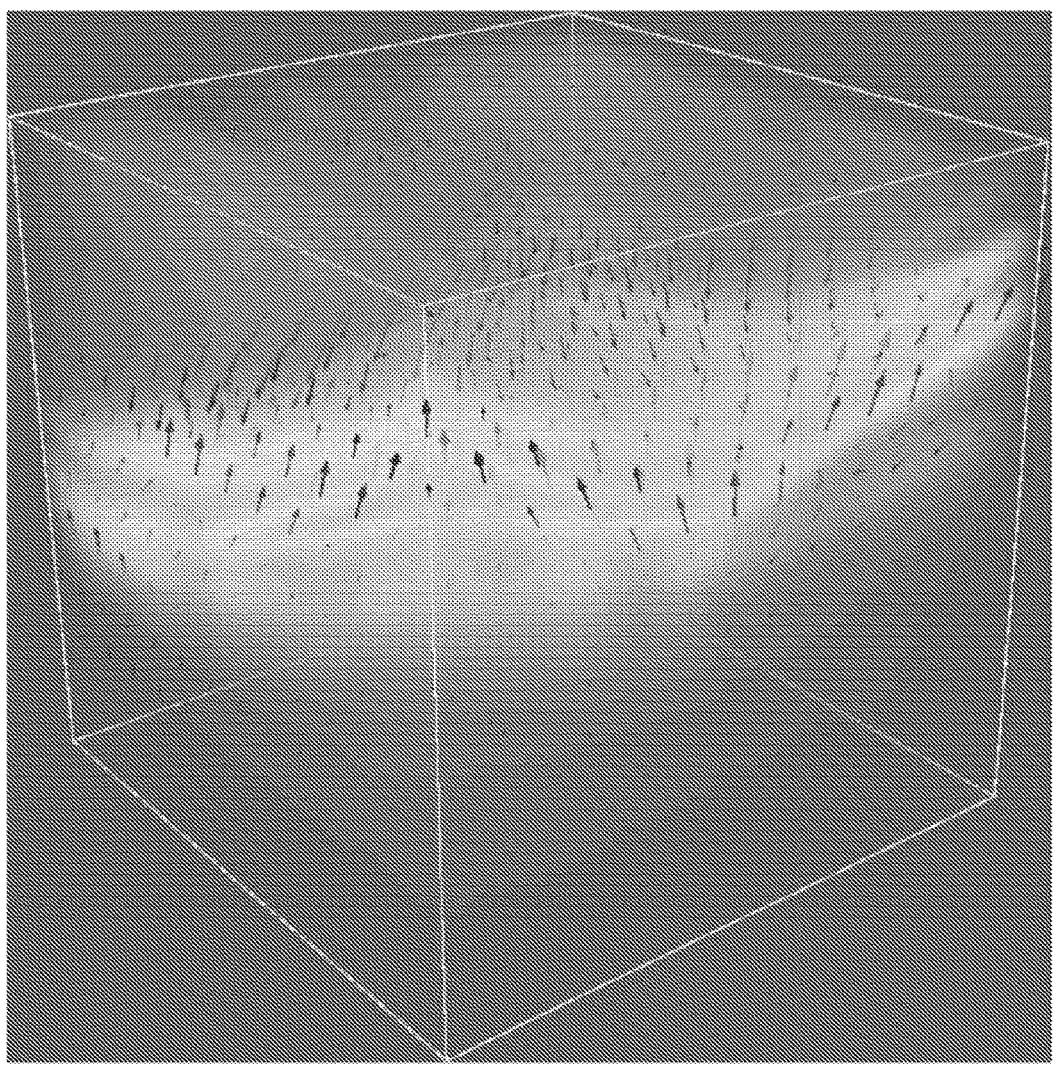
FIG. 5B illustrates a deformation field after regularization.

FIG. 5A and FIG. 5B illustrate the impact of regularization on the deformation field of a 3D OCT volume. FIG. 5A illustrates a deformation field before regularization. FIG. 5B illustrates a deformation field after regularization. As a further explanation, FIG. 5A and FIG. 5B demonstrate the effect of regularization on the deformation field of a 3D OCT volume, where the spacing along each dimension was made equal to give an isotropic illustration. Voxels represented by the darker, larger arrows indicate large node displacement while voxels represented by the lighter, smaller arrows indicate small node displacement. The impact of parameter $\sigma$ in Eq. 4 can comprise the capture range towards the desired surface and its localization accuracy.

In an aspect, content based graph construction can be performed. A directed graph G can be constructed from the input image I using the conventional graph search methods, as briefly described herein. Then the deformation field F(x, y, z) can be applied to deform each node in G with Eq. 2. That is, each node $v$ at (x, y, z) can be deformed to v(x', y', z') with (x', y', z')=(x, y, z)+$\lambda$F (x, y, z). The deformation operation may violate the surface smoothness constraints. Note that the deformed graph nodes corresponding to the voxels on a voxel-column p(x, y) still can form a node-column Col(p) in G, and each target surface S can be monotonic with respect to each (e.g., deformed) node-column in G. The intra-column arcs thus need not to be modified. In the following, the adjustment to the inter-column (e.g., inter-sub-graph) arcs to incorporate the surface smoothness (e.g., separation) constraints is described.

For the surface smoothness constraints, consider two adjacent columns Col(p) and Col(q) in G. For any two nodes v(x, y, z) ∈ Col(p) and v(x', y', z') ∈ Col(q), if |z−z'|≤$\Delta$x (v(x, y, z) and v(x', y', z') are adjacent along the x-dimension) or |z−z'|≤$\Delta$y (v(x, y, z) and v(x', y', z') are adjacent along the y-dimension), then the corresponding voxel points I(x, y, z) and I(x', y', z') can be both on the target surface. To use the notation, a node v(x, y, z) can be described as on the surface, which means that a node's corresponding voxel is on the surface.

Figure 6:
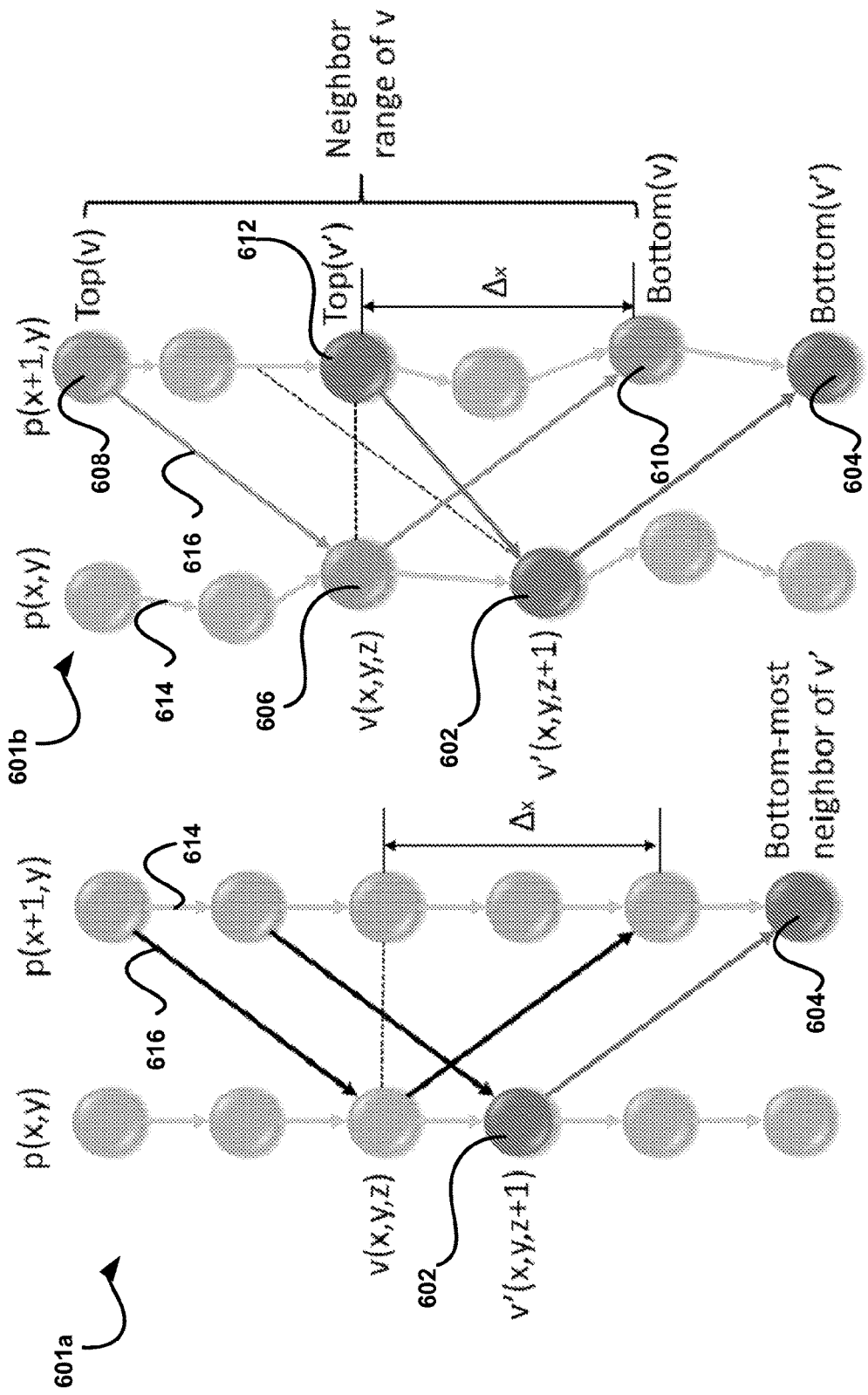
FIG. 6 shows a side-by-side comparison of a structure of conventional graph and a non-Euclidean deformed graph.

To explore the self-closure structure of the surface segmentation problem, the bottom-most neighbor and the top-most neighbor of a node v(x, y, z)∈ Col(p) on its adjacent column Col(q) can be defined: the bottom-most (resp., top-most) neighbor of v, denoted by Bottom$_q$(v) (resp., Top$_q$(v)), is a node on Col(q) with the smallest (resp., largest) z-coordinate that can be on the target surface together with v. In the case that the adjacent column is clear, the bottom-most (resp., top-most) neighbor can be denoted by Bottom(v) (resp., Top(v)) (e.g., as shown in FIG. 6). Thus, each node v(x, y, z) can interact with a range of nodes between Bottom$_q$(v) and Top$_q$(v) on Col(q), called the neighbor range of v on Col(q).

FIG. 6 shows a side-by-side comparison of a structure of conventional graph 601*a* (left side) and a non-Euclidean deformed graph 601*b* (right side). Node v' 602 and its bottom-most neighbor node 604 are illustrated in the structure of conventional graph 601*a*. In the non-Euclidean deformed graph 601*b*, node v 606, Top(v) 608, Bottom(v) 610 are illustrated as well as node v' 602, Top(v') 612, Bottom(v') 604.

In the conventional graph search method, the number of nodes in the neighbor range for every node of Col(p) can be the same, which, however, may differ in the deformed graph space. In one aspect, all the neighbor ranges of nodes on any column Col(p) can be properly ordered: for any nodes v, v'∈Col(p), if v' is "above" v (that is, the z-coordinate of v' is larger than that of v), then Bottom$_q$(v') and Top$_q$(v') are no "lower" than Bottom$_q$(v) and Top$_q$(v) (with respect to the z-coordinates), respectively, on the adjacent column Col(q).

BL(S) can denote all the nodes on or below a surface S. The proper ordering of the neighbor ranges can admit the intra-layer self-closure structure: For any feasible surface S, the bottom-most neighbors of every node in BL(S) can be contained within BL(S). This property is the very property that can connect the optimal surface segmentation to the minimum-cost closed set problem. In content based graph construction, two types of arcs, intra-column arcs 614 and inter-column arcs 616, are illustrated in FIG. 6. The intra-column arcs 614 make sure that all nodes below a given node are also included in the closed set, which enforce the monotonicity of the target surface. The inter-column arcs 616 can impose the smoothness constraints by directing to the bottom-most neighbors of a given node. If the nodes estimated in the initially constructed graph are deformed (e.g., the edges connecting the node pairs are retained), the resulting graph may not correctly impose the surface smoothness constraints or the surface separation constraints, due to the non-uniform shifts of the nodes.

The same strategy can be used to extend the method to simultaneously detect interrelated surfaces with surface separation constraints. The surface separation constraints in a d-D image can be viewed as the surface smoothness constraints of a (d+1)-D image, comprising a stack of $\kappa$d-D images. Segmenting a set of $\kappa$ surfaces in a d-D image can be equivalent to the detection of a single optimal surface in a (d+1)-D image.

Figure 7C:
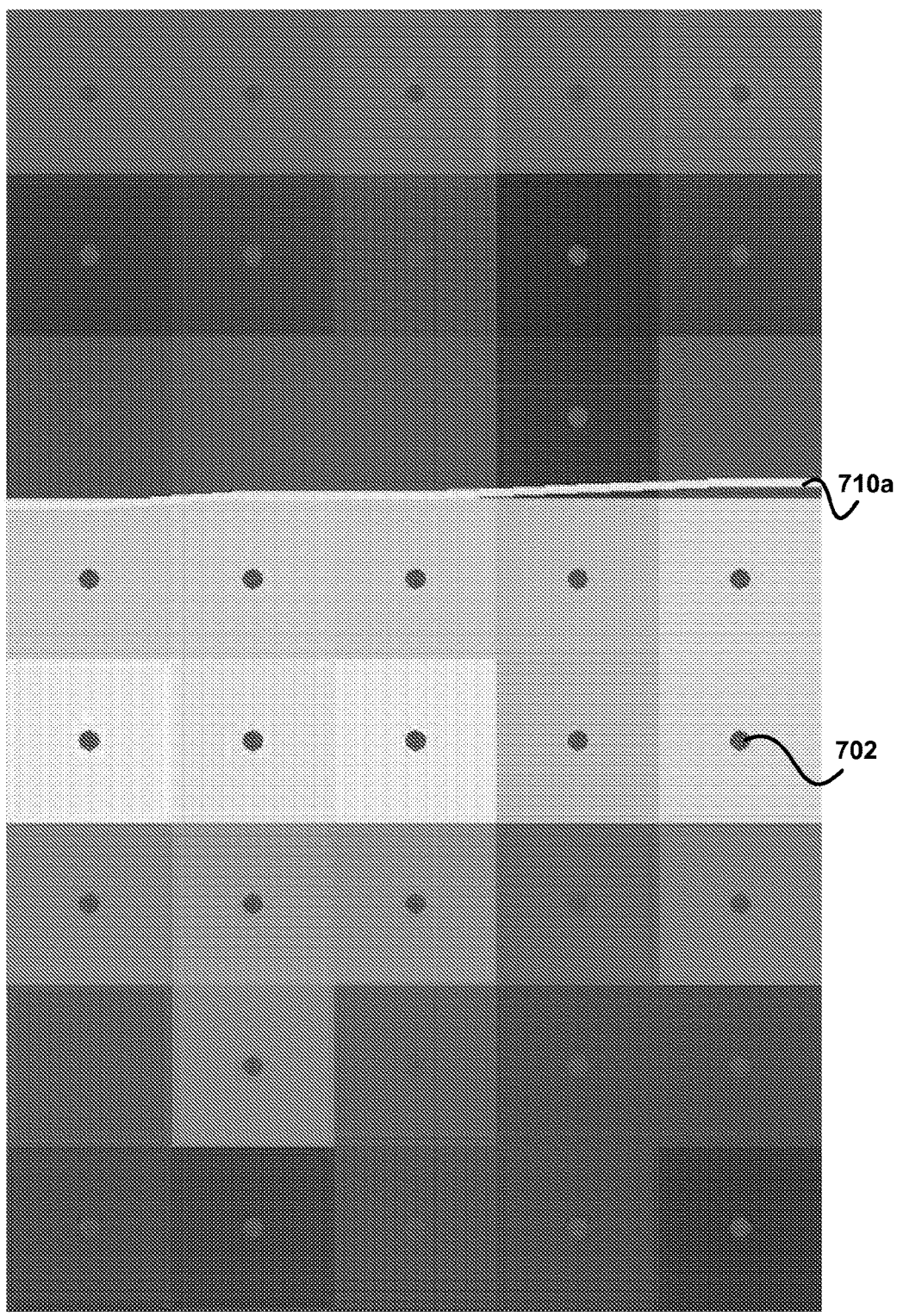
FIG. 7C shows a node distribution in conventional graph structure.
Figure 7D:
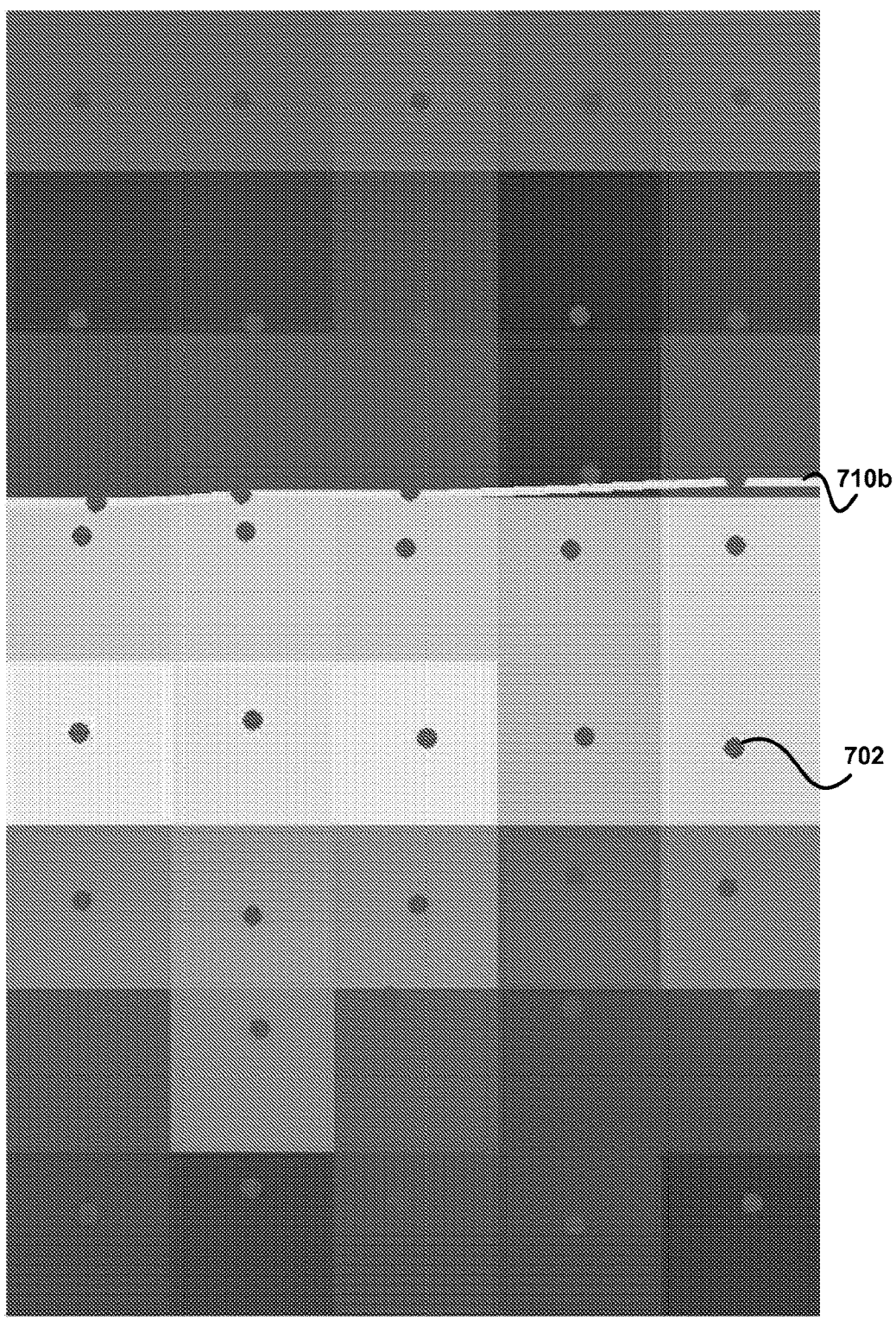
FIG. 7D shows a node distribution Non-Euclidean deformed graph model.

FIG. 7A and FIG. 7B show a comparison of a conventional graph construction and a Non-Euclidean deformed graph model. Likewise, FIG. 7C and FIG. 7D show a comparison of the node distribution between the conventional graph construction and the Non-Euclidean deformed graph model. FIG. 7A shows a conventional graph structure. FIG. 7B shows a Non-Euclidean deformed graph model. A node 702 is created within each pixel 704. Intra-column arcs 706 and inter-column arcs 708 are shown as arrows, which represent smoothness constraints that can be incorporated in a typical graph search framework. The curves 710*a* and 710*b* can indicate the desired dark-to-bright surface location mapped from a high resolution B-scan.

As a further explanation, FIG. 7A and FIG. 7B illustrate a comparison of the Euclidean graph 700*a* (FIG. 7A) to the non-Euclidean graph 700*b* after deformation (FIG. 7B) within the region highlighted by the rectangle 410 in FIG. 4B. After deformation, a node 702 can be created within each voxel 704. Referring to the true boundary shown in FIG. 4B, distances between neighboring nodes created in those critical regions are smaller than the distance between voxel centers, allowing subvoxel surface positioning accuracy to be achieved. FIG. 7C and FIG. 7D show the nodes in the conventional and non-Euclidean deformed graph model, showing that node density is increased near the expected surface, and decreased elsewhere.

The costs associated with each node 702 can reflect the properties of the node 702 with respect to the underlying surfaces. For instance, to identify layered tissues, terrain-like surfaces, separated by either dark-to-bright or bright-to-dark transitions, the gradient component along the z-dimension with an opposite orientation can be assigned as the on-surface cost associated with each node 702 for simplicity, derived from convolution of volume I with the first derivative of 3D Gaussian kernel $G'_z(x, y, z)$:

$$w(x, y, z) = \begin{cases} -G'_z(x, y, z) * I(x, y, z), & \text{dark-to-bright transition,} \\ G'_z(x, y, z) * I(x, y, z), & \text{bright-to-dark transition.} \end{cases} \quad (6)$$

Other costs can be employed, as in conventional graph search, which makes it possible to include not only boundary (on-surface cost) but also region (in-region cost) properties.

Since the deformation field $F(x, y, z)$ may deform each node 702 away from the center of voxel 704/$(x, y, z)$, the original cost $w(x, y, z)$ derived from the evenly distributed voxel grid can be deformed or warped in a similar way, so that the nodes 702 in the non-Euclidean graph are assigned the correct costs $w^*(x, y, z)$ according to their location:

$$w^*(x,y,z) = w[(x,y,z) + F(x,y,z)] \quad (7)$$

Figure 8A:
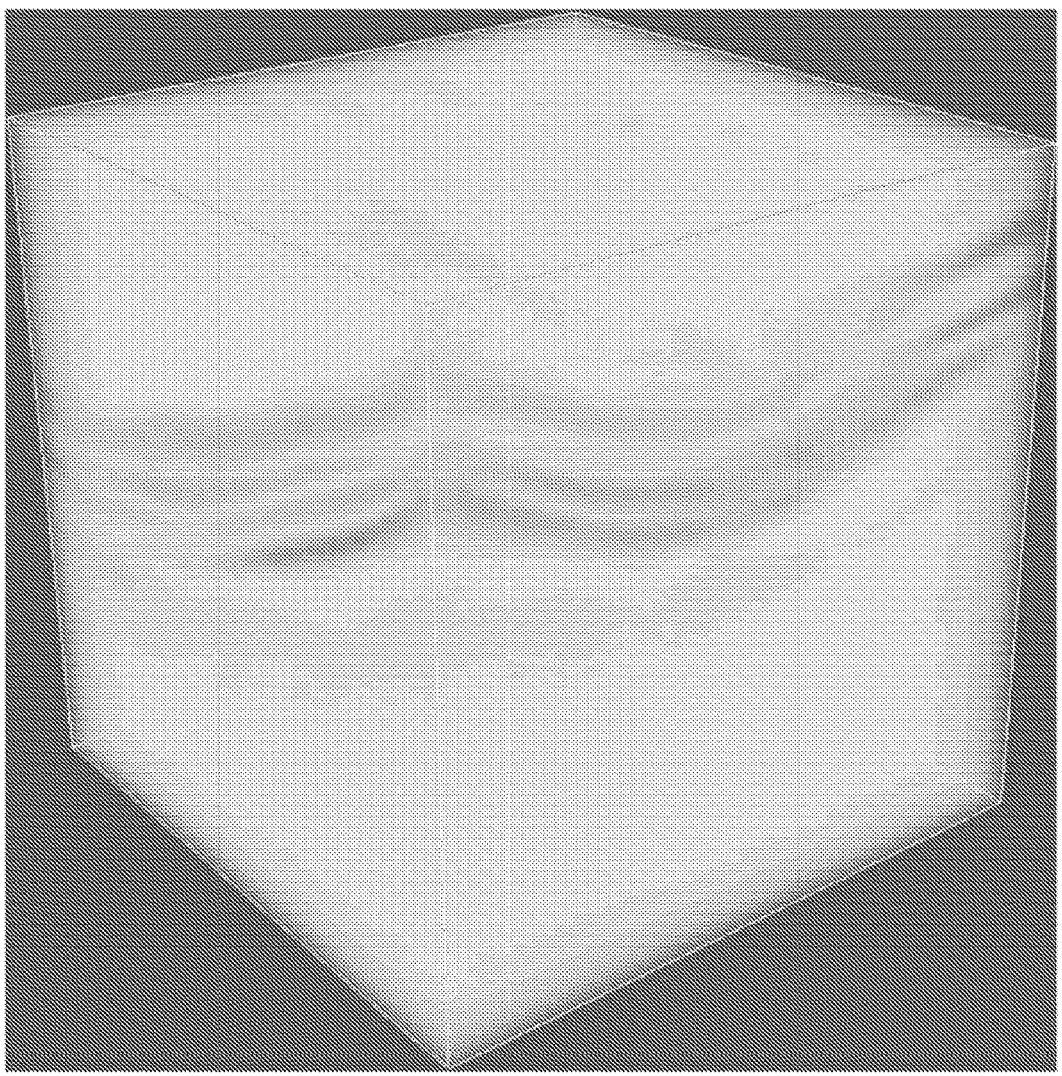
FIG. 8A illustrates original cost volume.
Figure 8B:
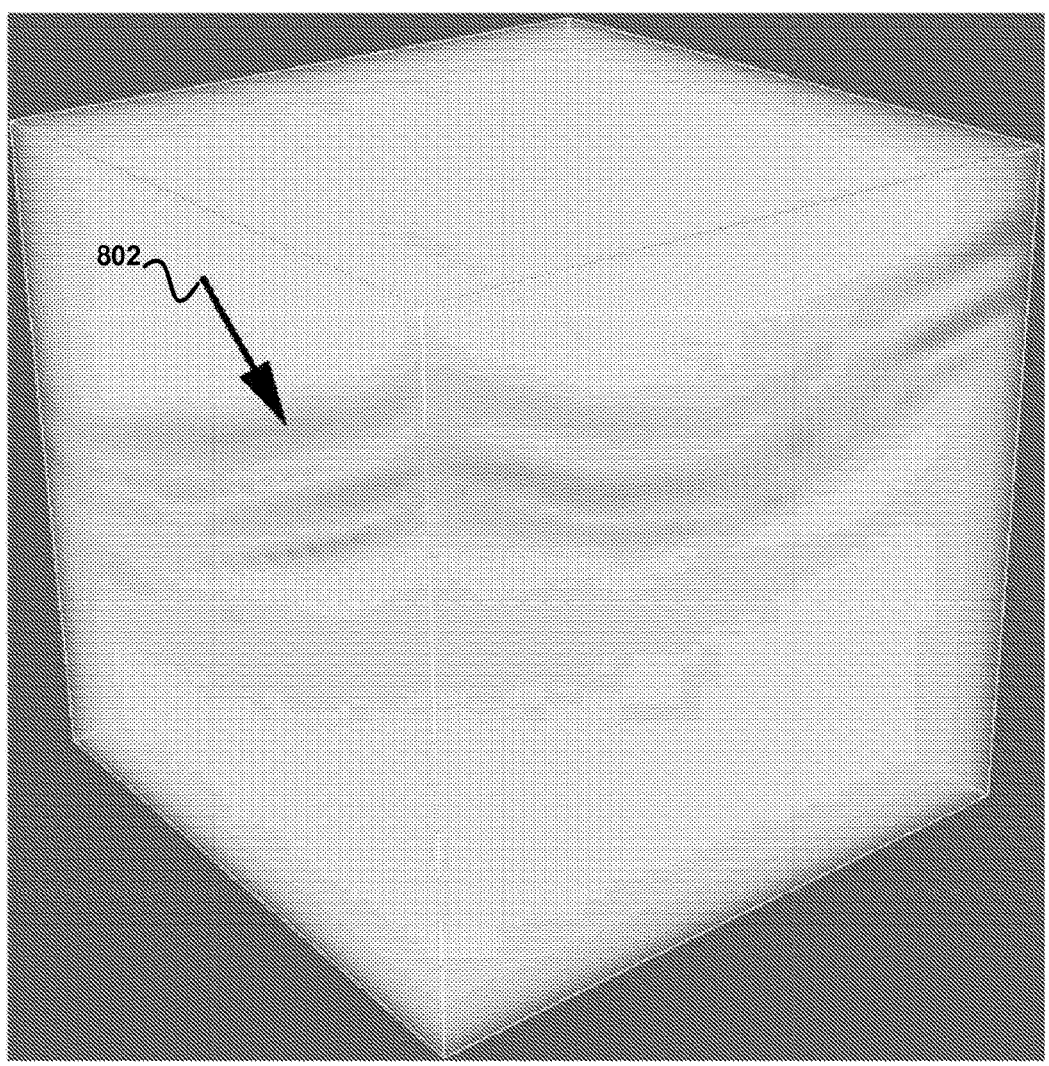
FIG. 8B illustrates cost volume after non-Euclidean deformation.

FIG. 8A and FIG. 8B show that node density is higher around target surface after non-Euclidean deformation by stretching area of interest indicated by an arrow 802 in FIG. 8B. FIG. 8A illustrates original cost volume. FIG. 8B illustrates cost volume after non-Euclidean deformation. If the new costs are plotted as a volume confined on an evenly distributed grid, as is shown in FIG. 8B, the low cost regions (indicated by the arrow 802), e.g., regions with high likelihood of being surface boundaries, are stretched out, which is equivalent to adaptively increasing the local node density in those highly relevant regions as explained herein.

The following description illustrates the disclosed methods and systems by describing example experimental results. In one aspect, surface segmentation (e.g., intraretinal surface segmentation) of images (e.g., SD OCT images) can be performed. Quantitative analysis of retinal layers can be important for diagnosis and management of a variety of eye diseases, such as diabetic macular edema and age-related macular degeneration, glaucoma and hereditary diseases like Best' disease. Some of these tissues can be only one or two voxels thick with even the most advanced clinically available OCT imaging technology.

In one aspect, graph search segmentation can be more accurate than human experts. To be able to fairly compare two segmentation algorithms, e.g. the standard approach and the non-Euclidean graph approach, the segmentation of standard volumes at full resolution can be used as a reference standard. By downsampling the full resolution volumes, a "input volume data" can be created which can then be segmented by the two approaches, and the resulting segmentation then compared to the reference standard, allowing quantitative performance evaluation.

Figure 9A:
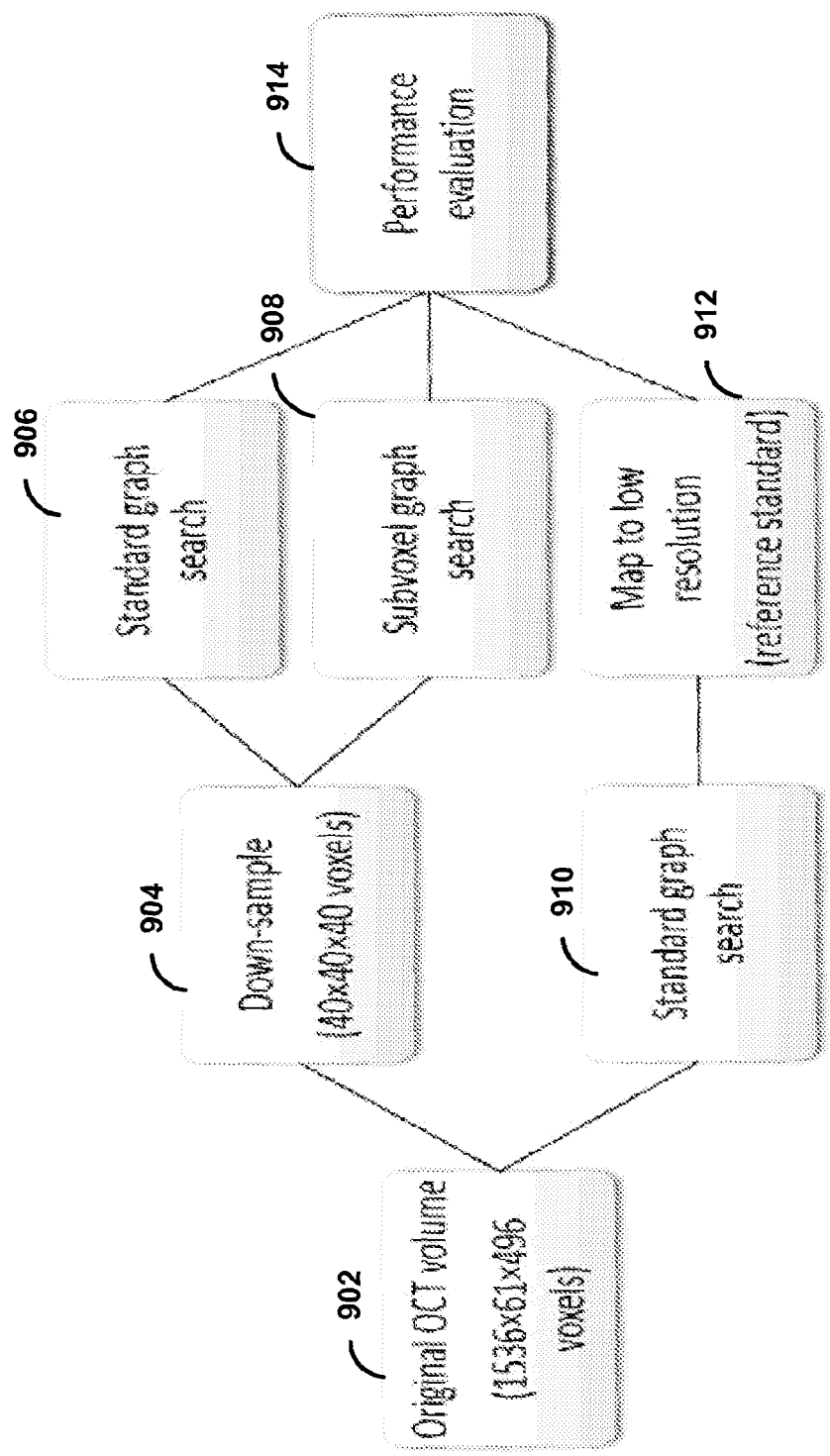
FIG. 9A is a flowchart illustrating steps in evaluating a Non-Euclidean graph search.

FIG. 9A is a flowchart illustrating steps in a evaluating a Non-Euclidean Graph Search. In step 902 ten OCT volumes with size of 1536×61×496 voxels, covering a region of 9.37×7.93×1.92 mm$^3$ of the retina, were obtained from 10 normal subjects using a Spectralis (Heidelberg, Germany) OCT machine. Two surfaces were identified using the Iowa Reference Algorithms, an implementation of the conventional graph search approach. In step 904, down-sampled OCT volume is determined. The original OCT volumes were down-sampled to 40×40×40 voxels. In step 906 a standard graph search of the down-sampled OCT volume is performed. In step 908, a subvoxel graph search is performed of the down-sampled OCT volume. In step 910, standard graph search is performed on the original OCT volume. In step 912, the standard graph search is mapped to low resolution as a reference standard. In step 914, the results of steps 906, 908, and 912 are evaluated to determine the performance of the steps 906 and 908. The high resolution volume and segmentation are used here to derive a reference standard for performance evaluation.

Figure 9B:
FIG. 9B illustrates an example original B-scan.
Figure 9C:
FIG. 9C illustrates two surfaces identified in the example B-scan.

One such B-scan with the resulting segmentation is shown in FIG. 9B and FIG. 9C. FIG. 9B and FIG. 9C illustrate an example B-scan of the high resolution OCT volume. FIG. 9B illustrates an example original B-scan. FIG. 9C illustrates two surfaces 916 and 918 identified in the example B-scan.

Figure 10A:
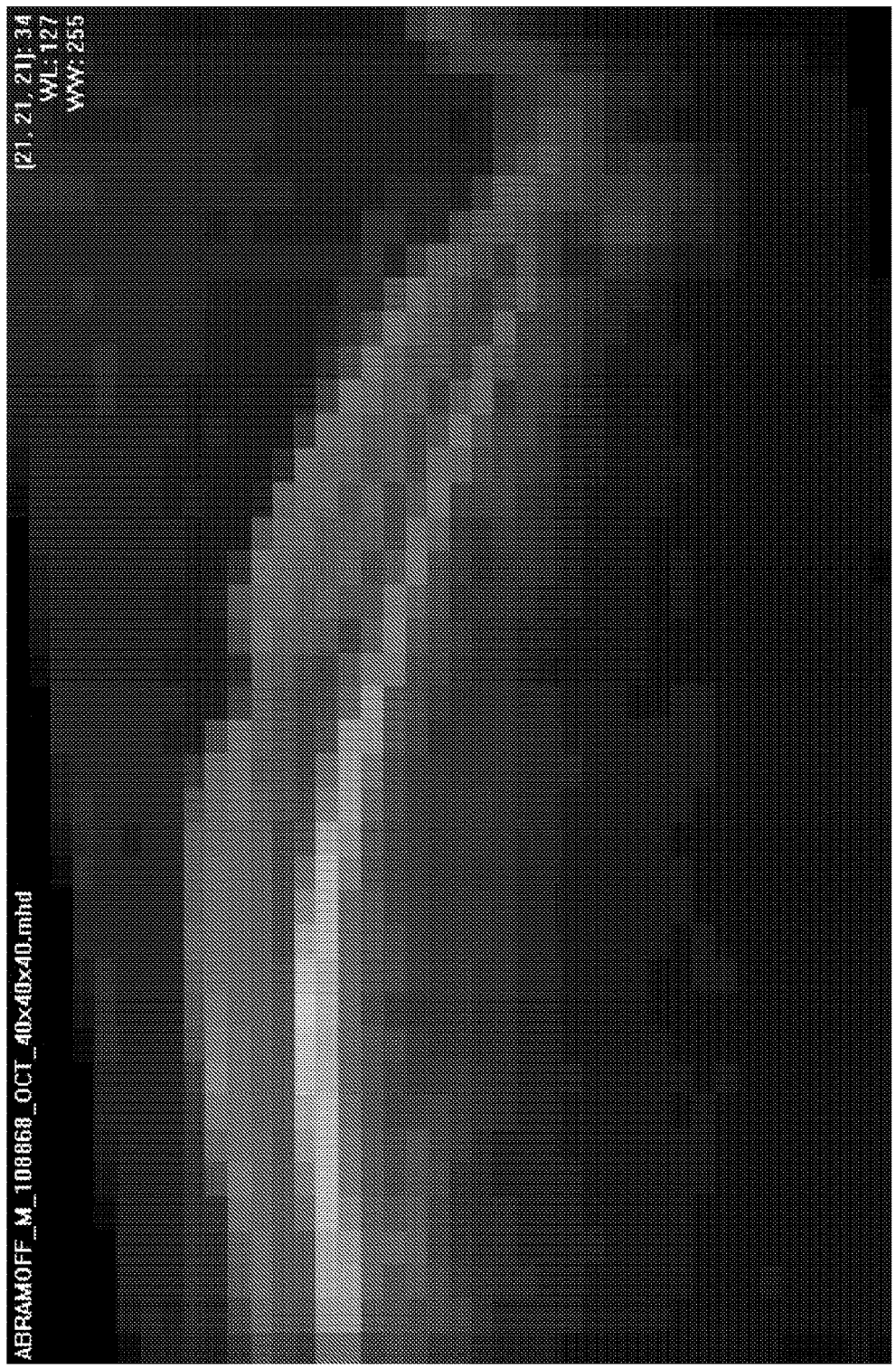
FIG. 10A shows an example B-scan.
Figure 10B:
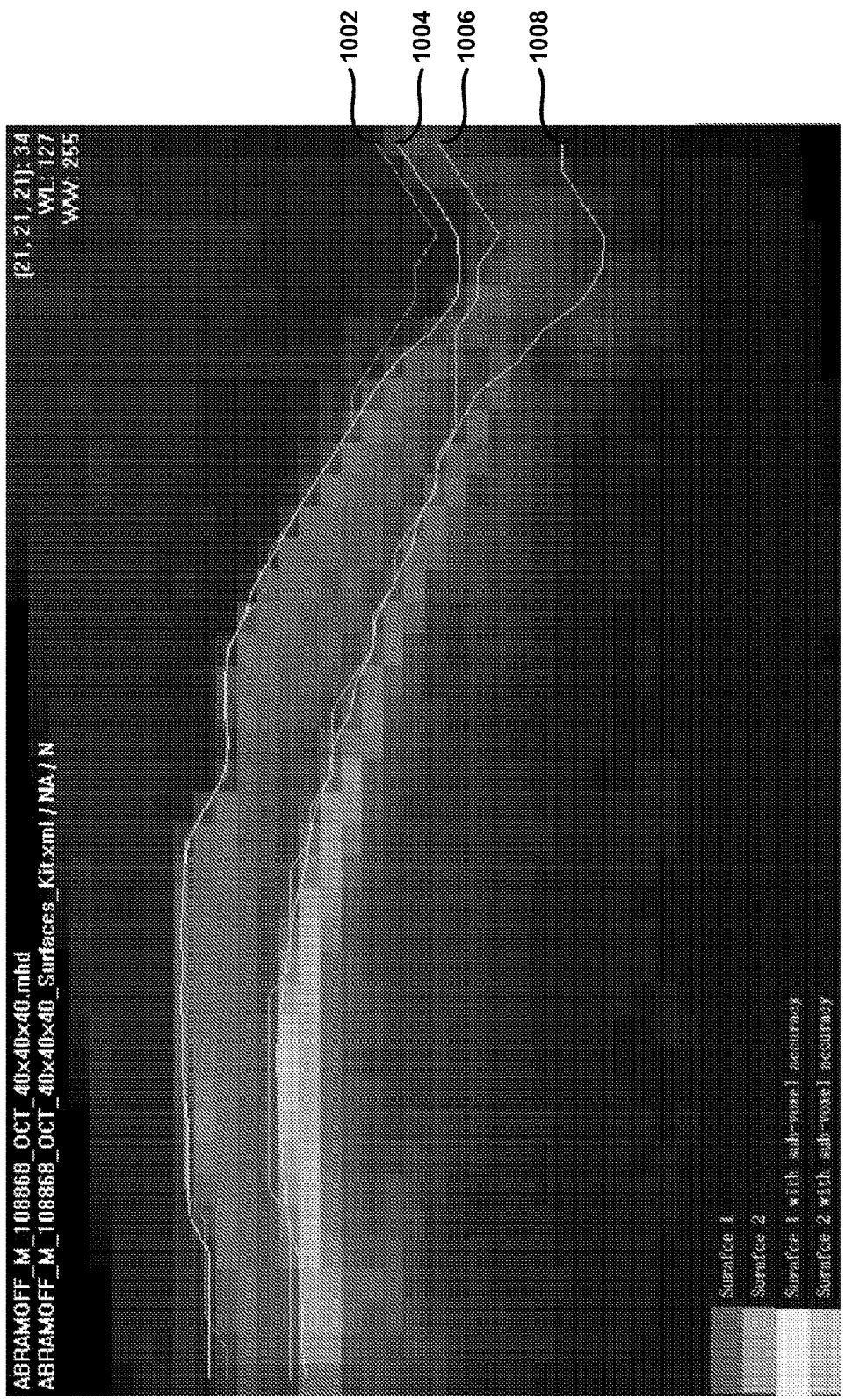
FIG. 10B illustrates two corresponding surfaces identified by the two approaches.

FIG. 10A and FIG. 10B illustrate an example B-scan of the down-sampled OCT volume. FIG. 10A shows an example B-scan. FIG. 10B illustrates two corresponding surfaces identified by the two approaches. The original OCT volumes were down-sampled to 40×40×40 voxels. The corresponding two surfaces, both with dark-to-bright transition, were identified in these "input volume data" using the Iowa Reference Algorithms and the present non-Euclidean graph search approach.

All other parameter settings were kept same in the two methods: the surface smoothness constraints between neighboring columns were set at one voxel, the minimum and maximum surface separation constraint were 3 and 8 voxels respectively. The σ in the 3D Gaussian derivative kernel used to derive the deformation field and assign the cost was 0.3 voxel in all 3 dimensions. The choice of these parameters can be primarily related to the resolution and aspect ratio of the data to be analyzed.

The upper surface $S_u$ 1002 in FIG. 10B corresponds to surface 902 in FIG. 9B and the lower surface $S_l$ 1006 corresponds to surface 904. Segmentation 1004 and segmentation 1008 represent the subvoxel surface segmentation results for surface 1002 and surface 1006, respectively. Note that linear interpolation can be applied to subvoxel surface segmentation result to get its location on the evenly distributed grid at each A-scan (x, y). Thickness d(x, y) of region bounded by surfaces $S_u$ and $S_l$ was then computed at each A-scan (FIG. 13) as:

$$d(x,y) = S_u(x,y) - S_l(x,y) \quad (8)$$

Figure 13A:
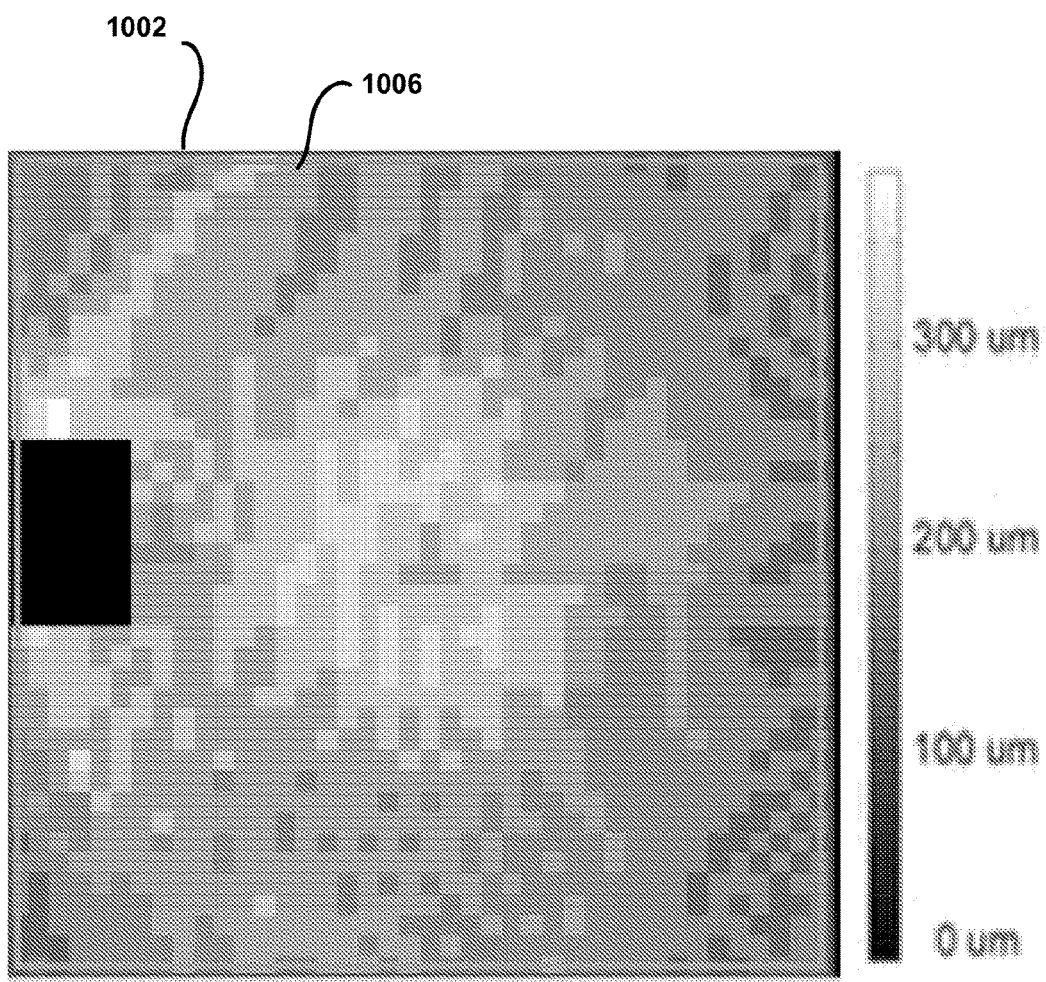
FIG. 13A shows segmentation by a conventional graph search of input volume data.
Figure 13B:
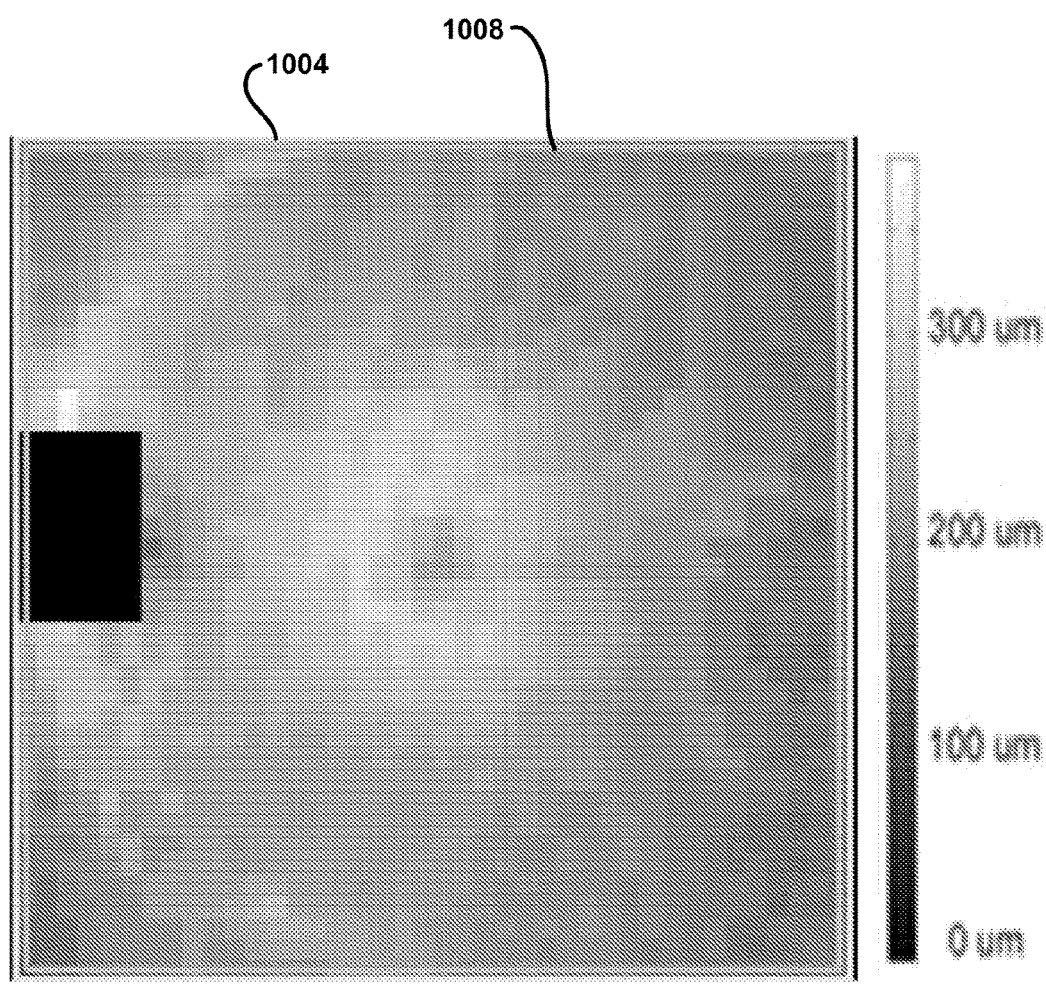
FIG. 13B shows segmentation by a Non-Euclidean graph search of input volume data.
Figure 13C:
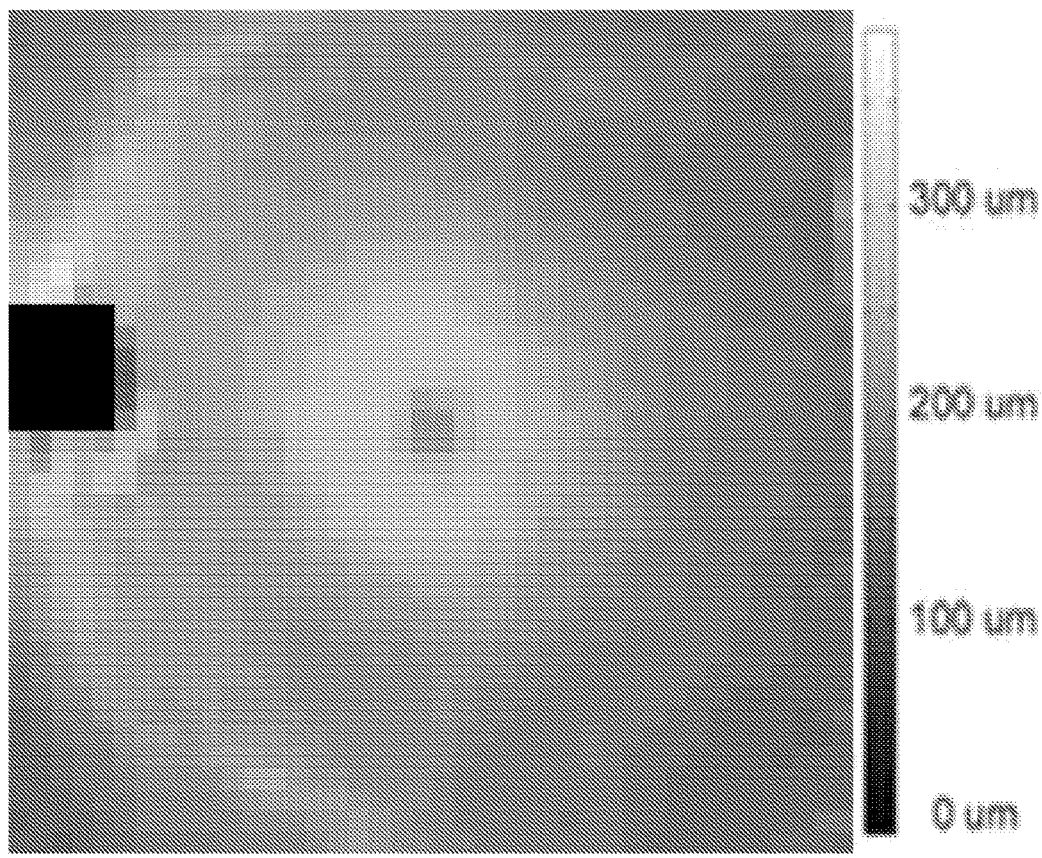
FIG. 13C shows a mapping from results of segmentation of the reference standard volume.

FIG. 13A, FIG. 13B, and FIG. 13C illustrate example mapping of tissue thickness of a region bounded by two coupled terrain-like surfaces (the layer containing the outer segments of the retinal photoreceptors). FIG. 13A shows segmentation by a conventional graph search of "input volume data" delineated by upper surface $S_u$ 1002 and the lower surface $S_l$ 1006 of FIG. 10B. FIG. 13B shows segmentation by a Non-Euclidean graph search of "input volume data" delineated by line 1004 and line 1008 of FIG. 10B. FIG. 13C shows a mapping from results of segmentation of the reference standard volume.

Figure 14A:
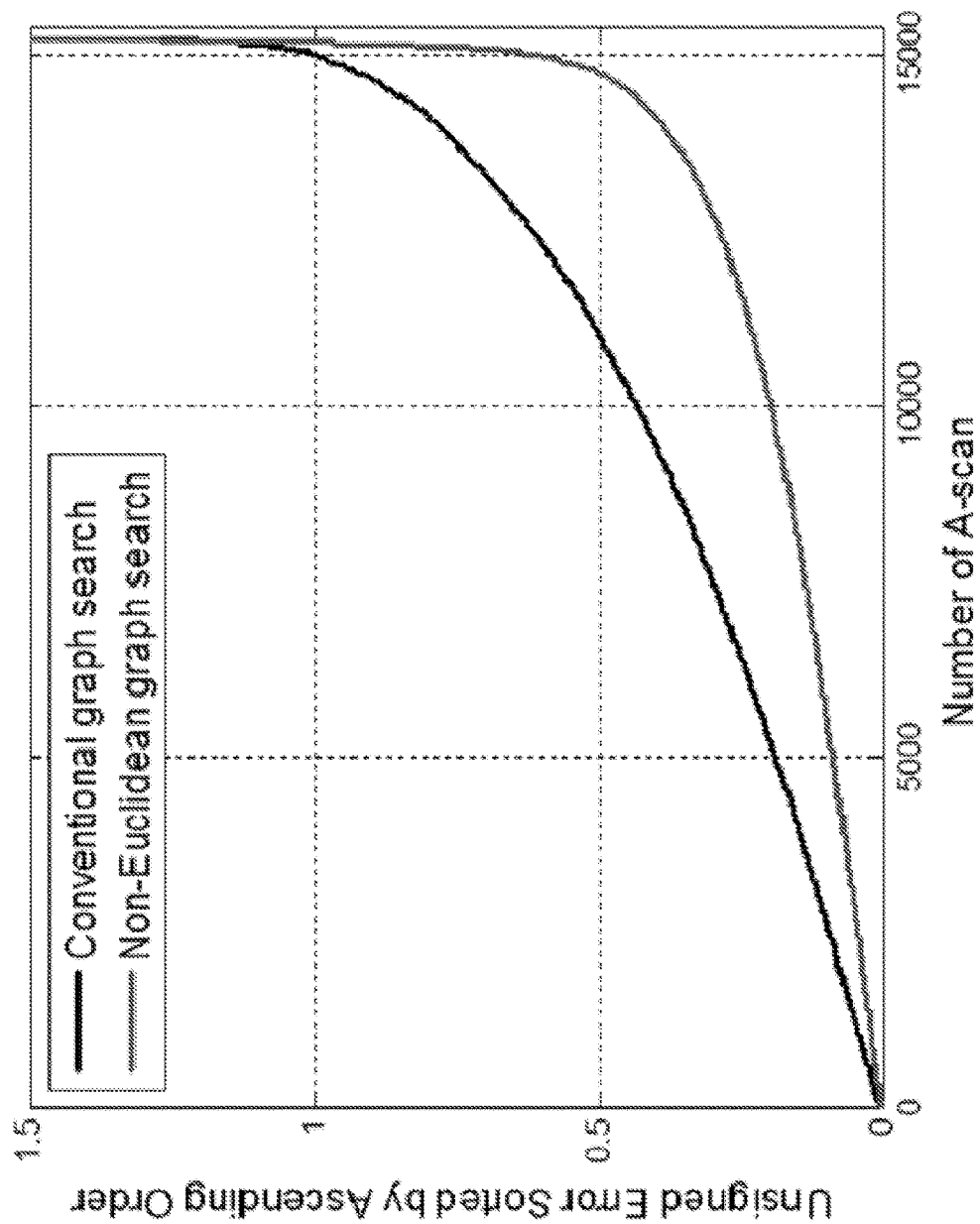
FIG. 14A is a graph illustrating a comparison of unsigned error of thickness produced by conventional graph search and non-Euclidean graph search.
Figure 14B:
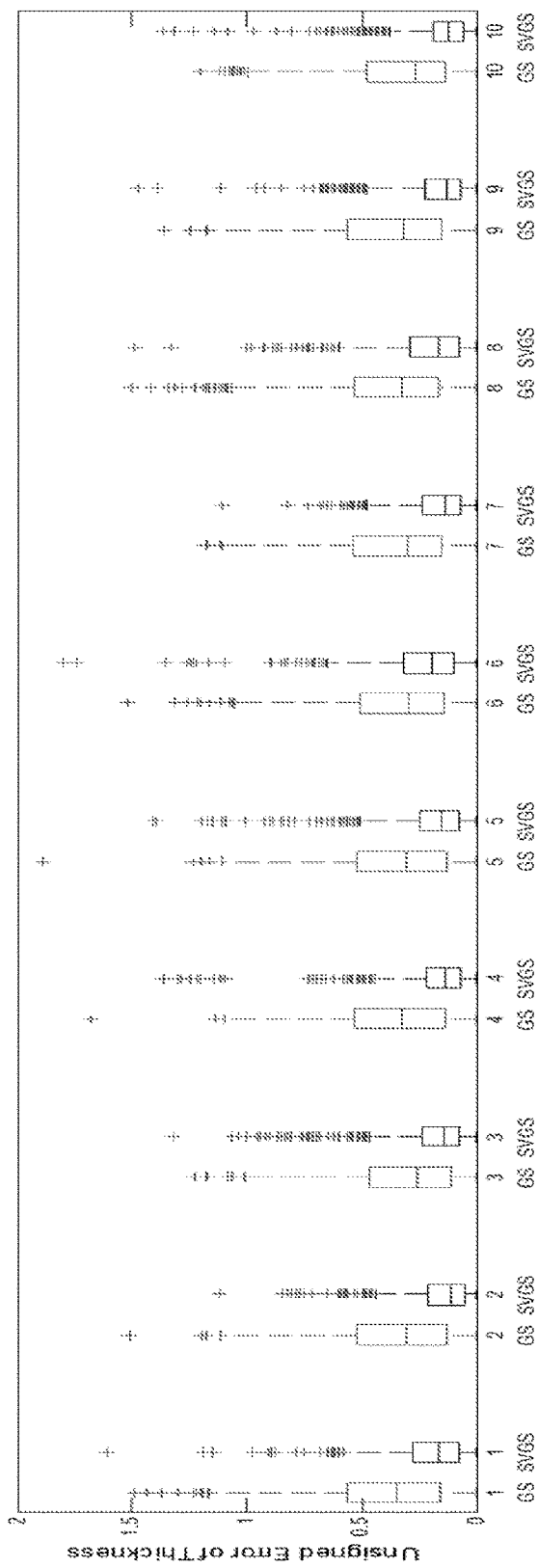
FIG. 14B is a box plot of unsigned error of tissue thickness using conventional graph search and non-Euclidean graph search with subvoxel accuracy.

In one aspect, statistical analysis can be performed. The mean signed $$\sum_{i=1}^{n} \frac{S_i - RS_i}{N}$$

and unsigned $$\sum_{i=1}^{n} \frac{|S_i - RS_i|}{N}$$

surface positioning errors and layer thickness errors can be calculated from the reference surface RS and then corrected for the fixed bias caused by the downsampling boundary shift. The difference between the mean errors for standard graph search and non-Euclidean graph search can be tested for significance using a paired t-test. Because the optic nerve head region is not a tissue layer and requires entirely different non-surface segmentation approaches, a rectangular region of 7×9 A-scans was excluded from this analysis. The comparison is summarized in Table 1. In these 10 subjects, both signed and unsigned errors were significantly smaller for non-Euclidean graph search than for conventional graph search with a p-value <0.0001 for all six measurements listed, Table 1.

close to optic nerve head, which because of its vertical tissue orientation requires different techniques as mentioned above. FIG. 14A is a graph illustrating a comparison of unsigned error of thickness produced by conventional graph search and non-Euclidean graph search. FIG. 14B illustrates a box plot of unsigned error of tissue thickness among ten subjects using conventional graph search (GS) and non-Euclidean graph search with subvoxel accuracy (SVGS).

Figure 15C:
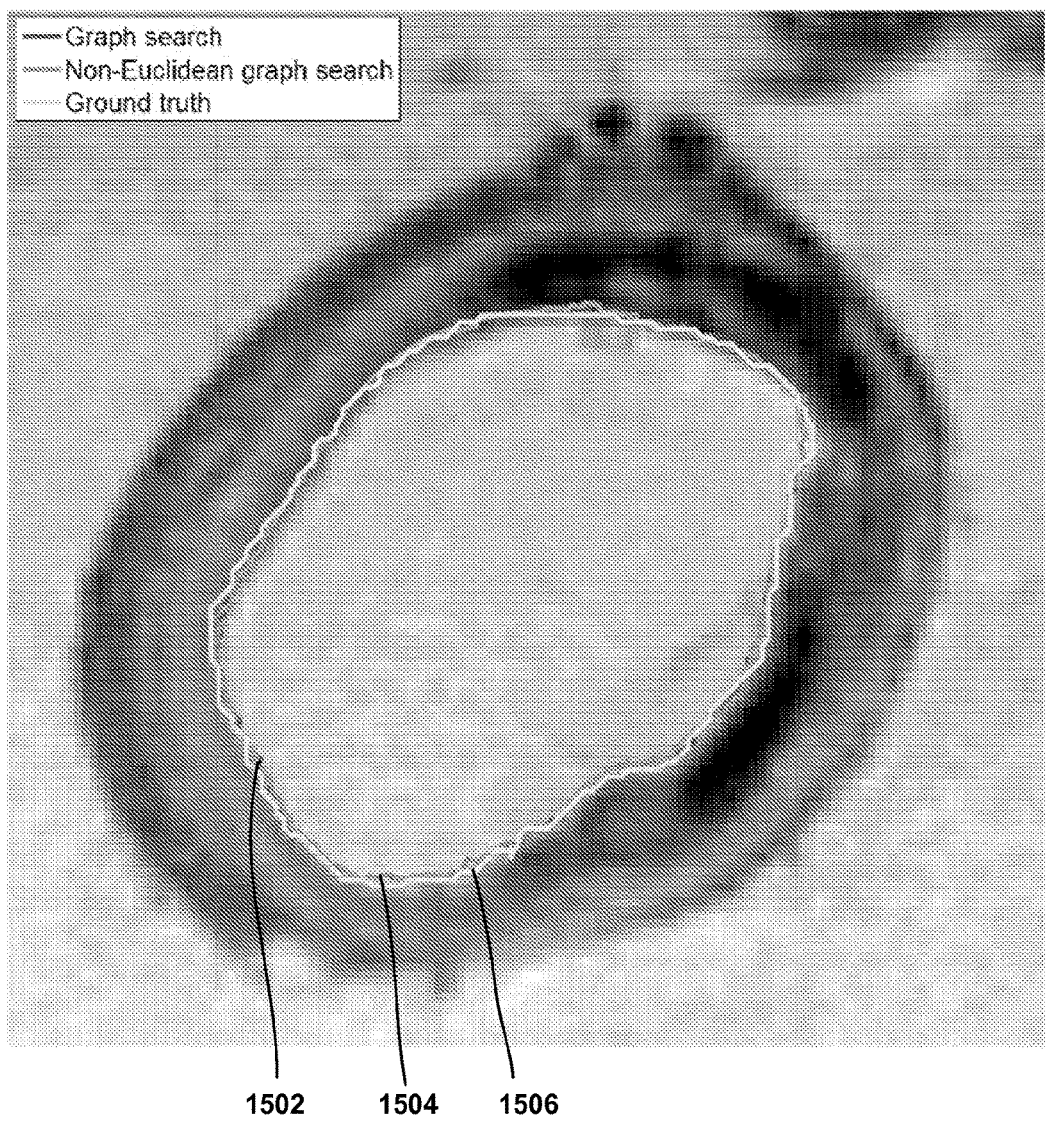
FIG. 15C shows example segmentation results of the original slice of the example vascular wall.
Figure 16A:
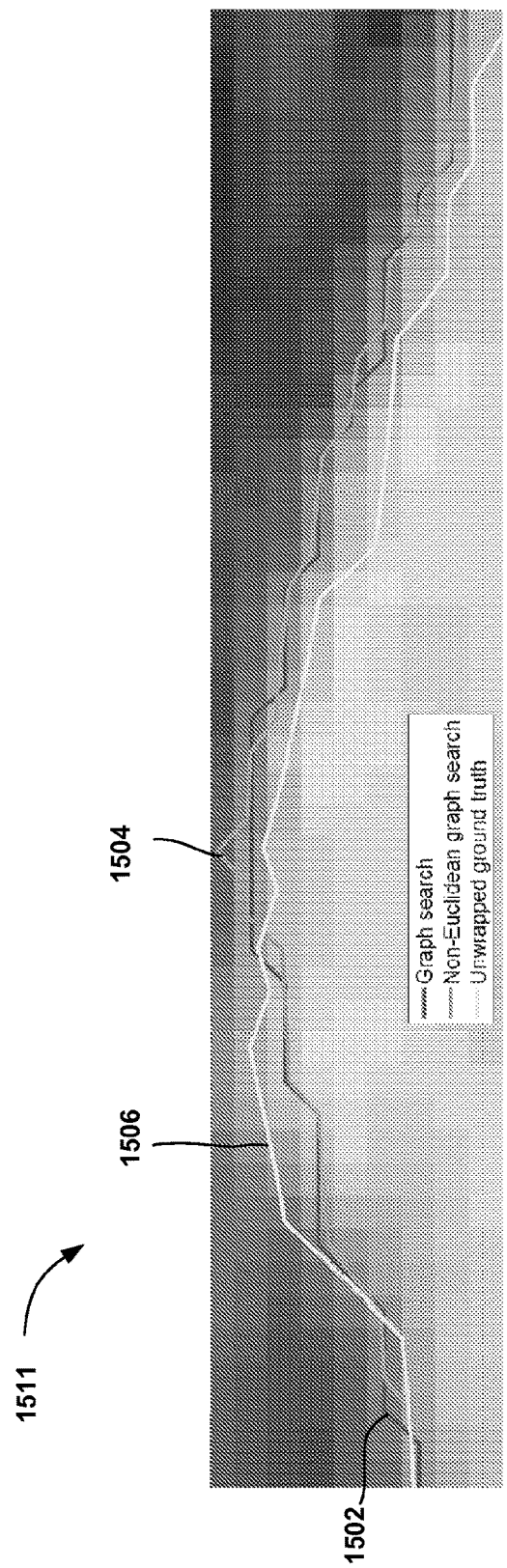
FIG. 16A shows a zoomed in view of a first region of the unwrapped slice of the example vascular wall.
Figure 16B:
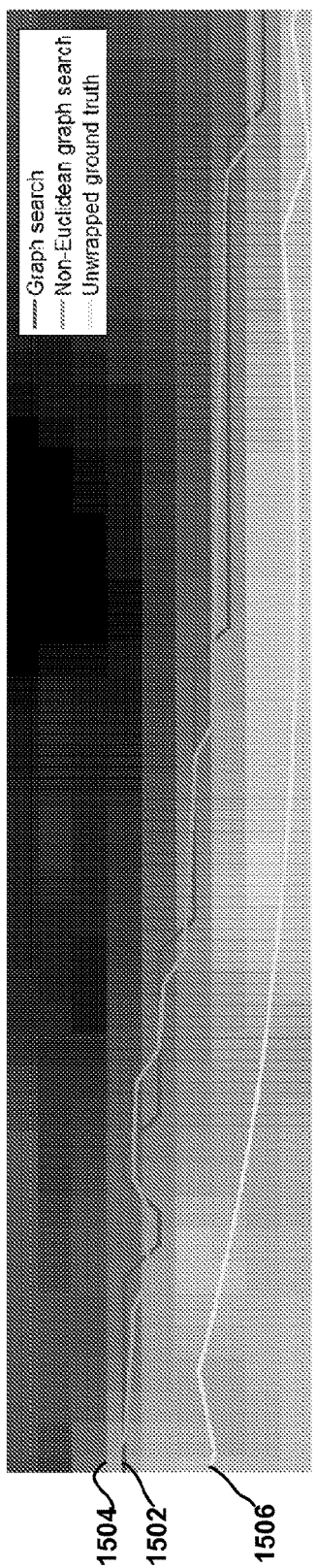
FIG. 16B shows a zoomed in view of a second region of the unwrapped slice of the example vascular wall.

In an aspect, vascular wall segmentation can be performed using 3-D MR Dataset. The algorithm was also applied to identify the vascular wall (the lumen) intima surface in 3-D MR image data. Two 3-D volumes with size of 141×141×16 voxels were cylindrically unwrapped at the center to 360× 16×70 voxels. One terrain-like surface was identified using both conventional graph search and non-Euclidean graph search. The surfaces were then mapped back to original volumes to highlight the cylindrical vascular wall (e.g., see FIG. 15C). The original volumes were manually annotated by an expert and superimposed in FIG. 15C. The manually traced boundaries were unwrapped and superimposed in FIG. 15C. More details are shown in FIG. 16A and FIG. 16B.

TABLE 1

Surface positioning error and thickness estimate error of region bounded by two coupled terrain-like surfaces

| Errors in voxels | Top Surface $S_u$ | | Bottom Surface $S_l$ | | Tissue Thickness d | |
|---|---|---|---|---|---|---|
| | Signed Error | Unsigned Error | Signed Error | Unsigned Error | Signed Error | Unsigned Error |
| $E_1$ (Conventional graph search) | −0.04 ± 0.34 | 0.28 ± 0.19 | 0.00 ± 0.34 | 0.28 ± 0.18 | 0.04 ± 0.44 | 0.36 ± 0.26 |
| $E_2$ (Smoothed conventional graph search) | −0.07 ± 0.31 | 0.26 ± 0.19 | −0.04 ± 0.31 | 0.25 ± 0.18 | 0.03 ± 0.31 | 0.25 ± 0.19 |
| $E^*$ (Non-Euclidean graph search) | −0.02 ± 0.23 | 0.16 ± 0.17 | −0.03 ± 0.19 | 0.15 ± 0.13 | −0.01 ± 0.24 | 0.18 ± 0.17 |
| Paired t-test p ($E_1$ vs. $E^*$) | 0.0180 | 0.0000 | 0.0000 | 0.0000 | 0.0000 | 0.0000 |
| Paired t-test p ($E_2$ vs. $E^*$) | 0.9311 | 0.0000 | 0.9311 | 0.0000 | 0.0010 | 0.0001 |

The differences between the two approaches may be larger than one voxel even though the maximum displacement applied to each node is no more than half of a voxel. This is because all nodes can encode the location more precisely and the globally optimal solution can be searched for in this new non-Euclidean graph space. More details can be observed in FIG. 11A, FIG. 11B, FIG. 11C, FIG. 11D, FIG. 12A, FIG. 12B, FIG. 12C, and FIG. 12D.

Figure 11A:
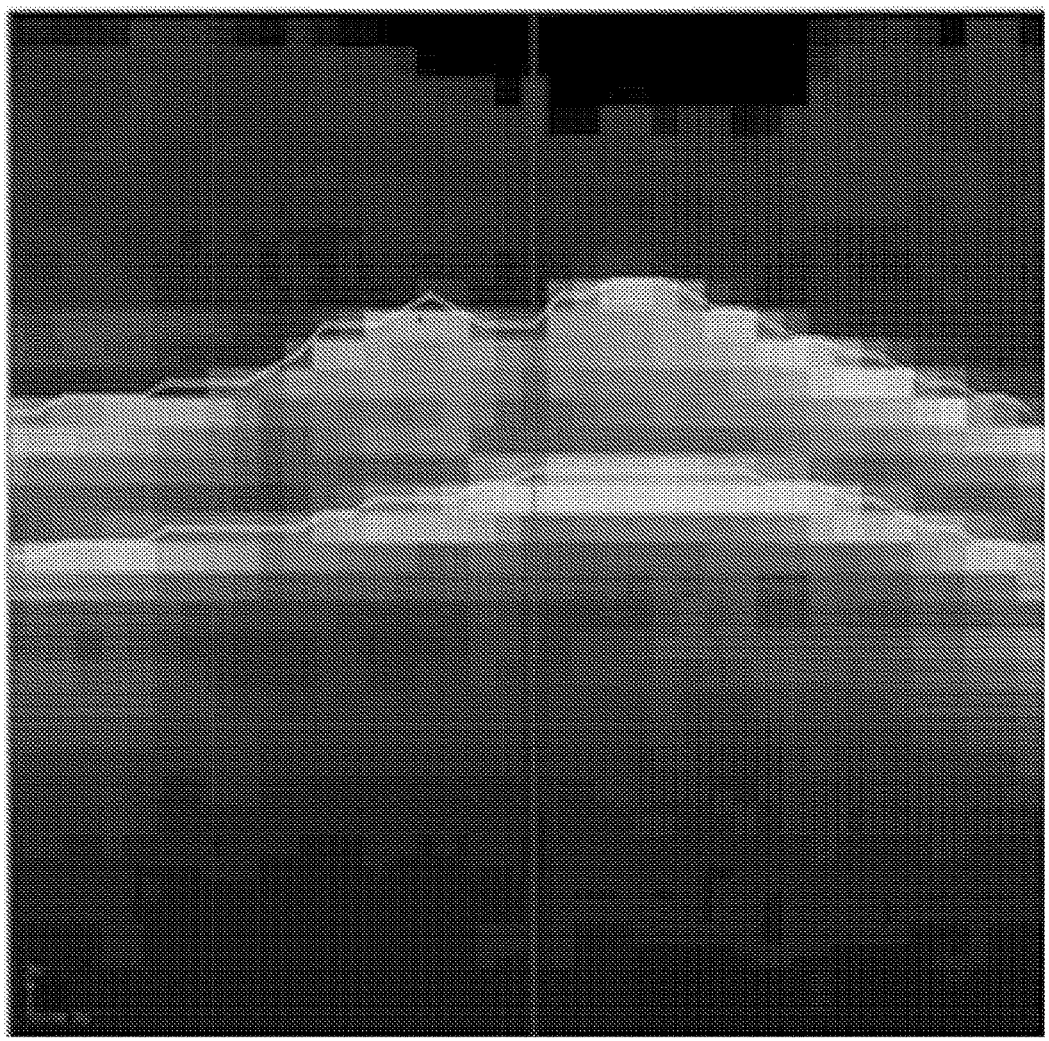
FIG. 11A shows a cross section of an example B-scan.
Figure 11B:
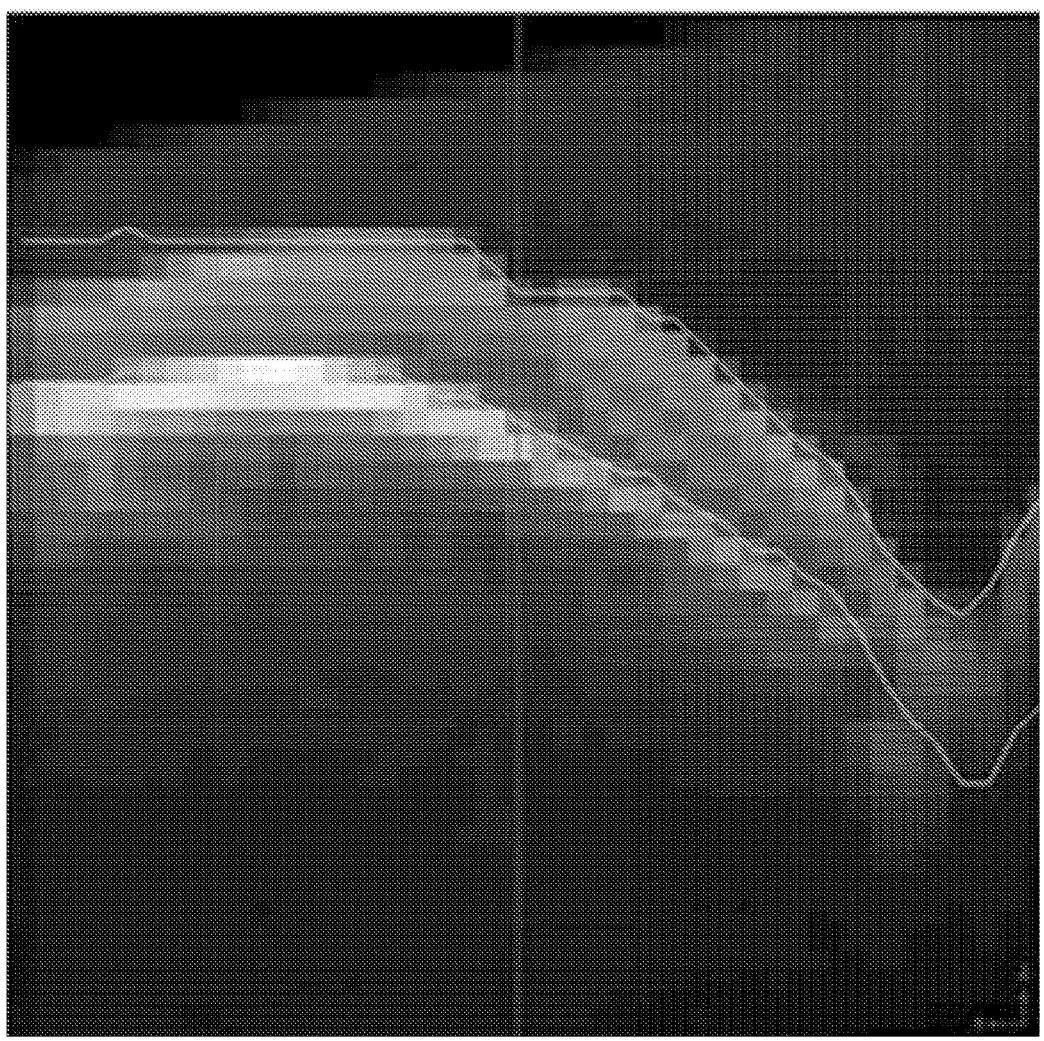
FIG. 11B shows a cross section perpendicular to the example B-scan.
Figure 11C:
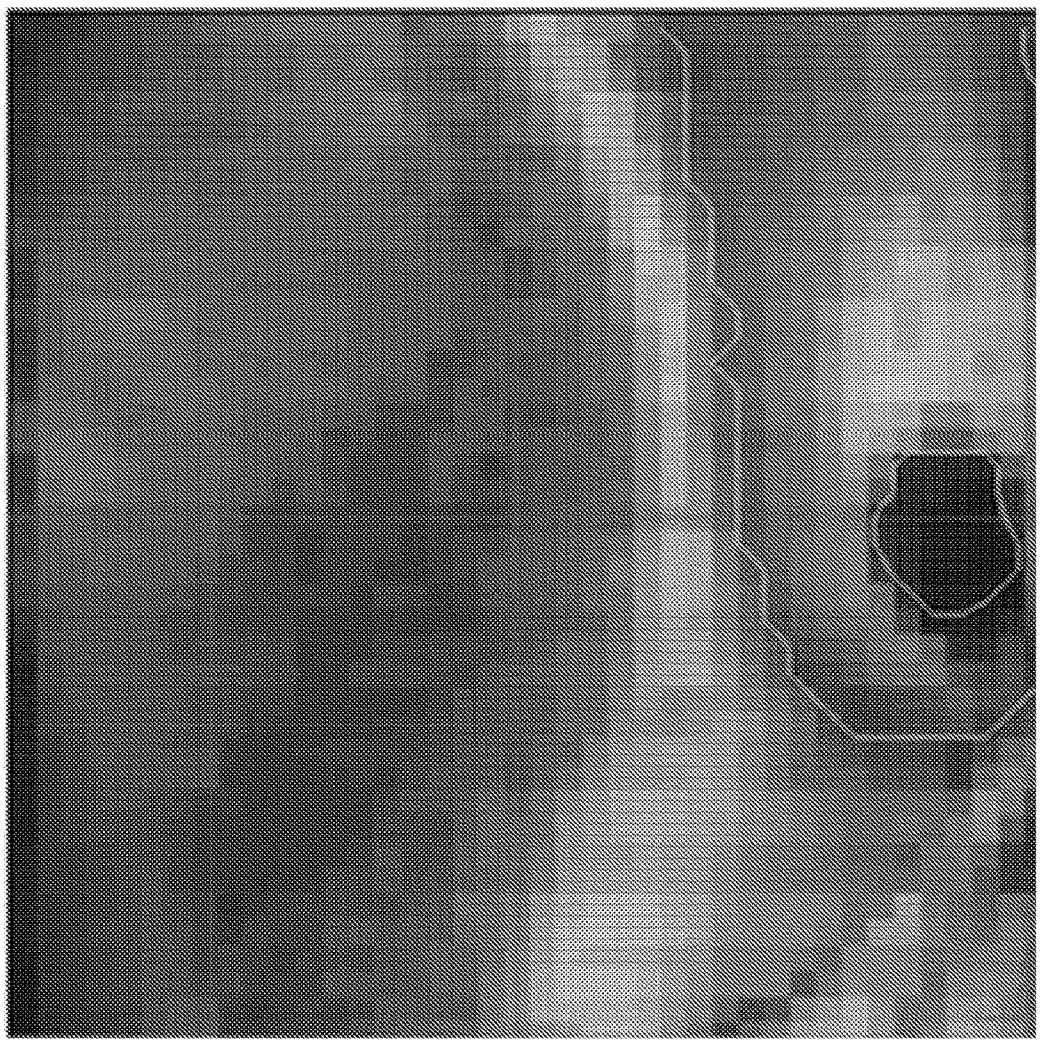
FIG. 11C shows a top view of the OCT volume.
Figure 11D:
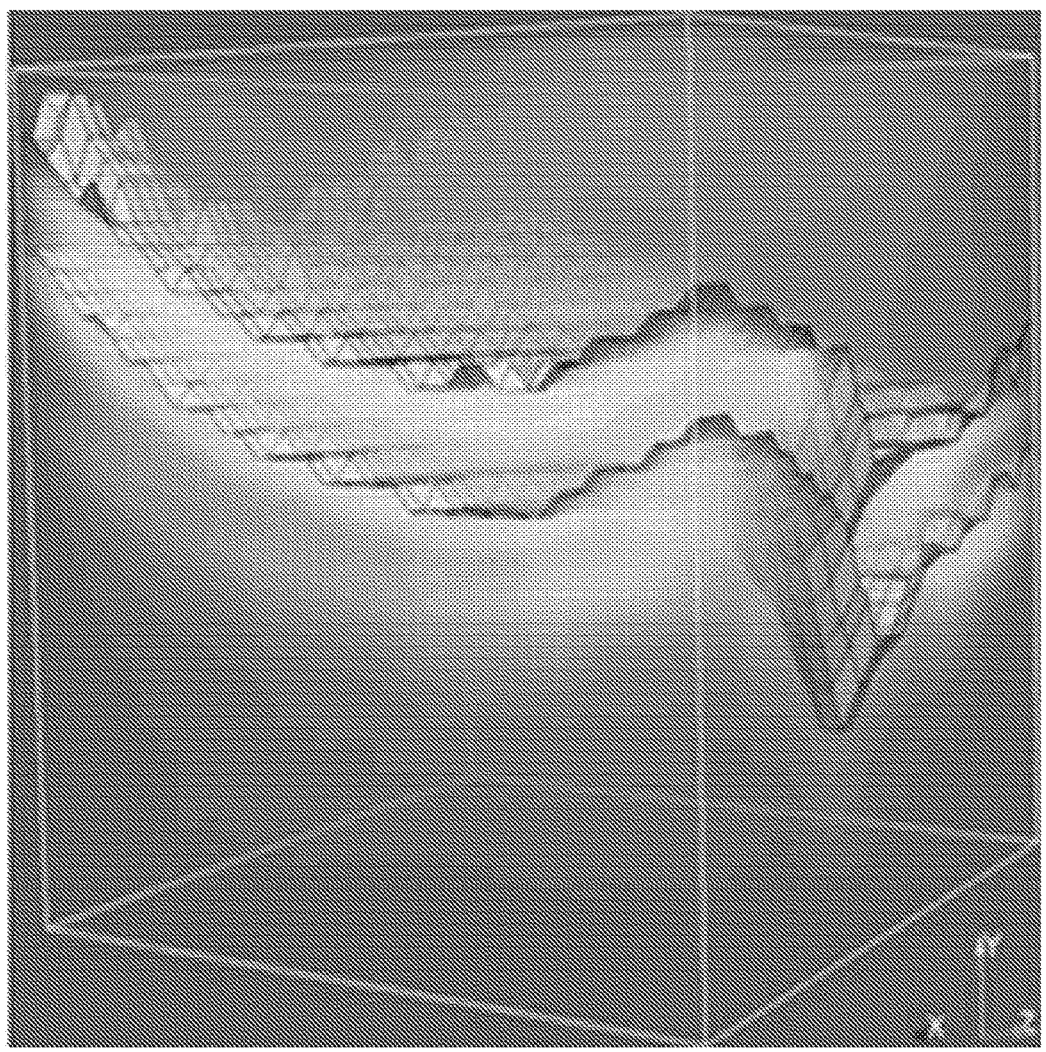
FIG. 11D shows an example 3D volume rendering.

FIG. 11A, FIG. 11B, FIG. 11C, and FIG. 11D illustrate segmentation of OCT volume with conventional graph search. FIG. 11A shows a cross section of an example B-scan. FIG. 11B shows a cross section perpendicular to the example B-scan. FIG. 11C shows a top view of the OCT volume. FIG. 11D shows an example 3D volume rendering.

Figure 12A:
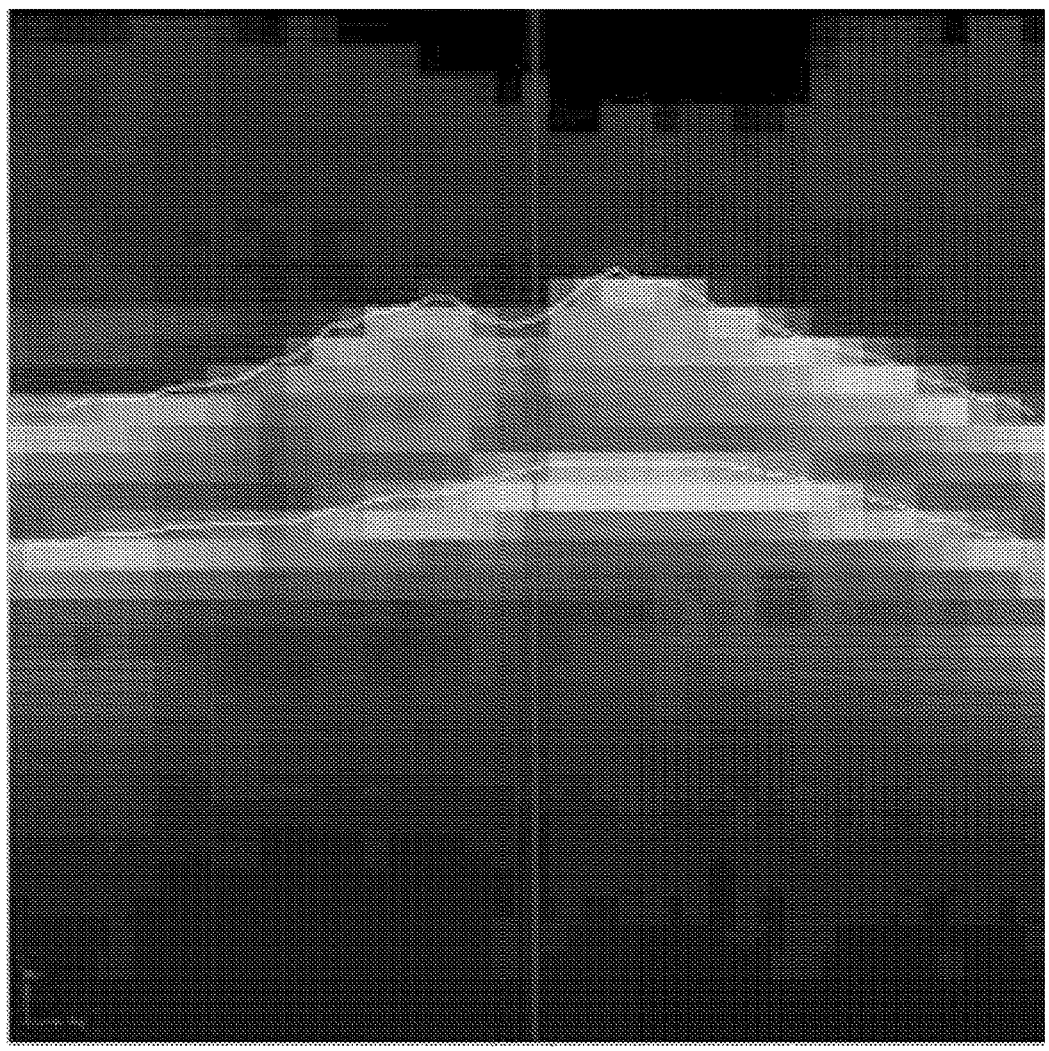
FIG. 12A shows a cross section of an example B-scan.
Figure 12B:
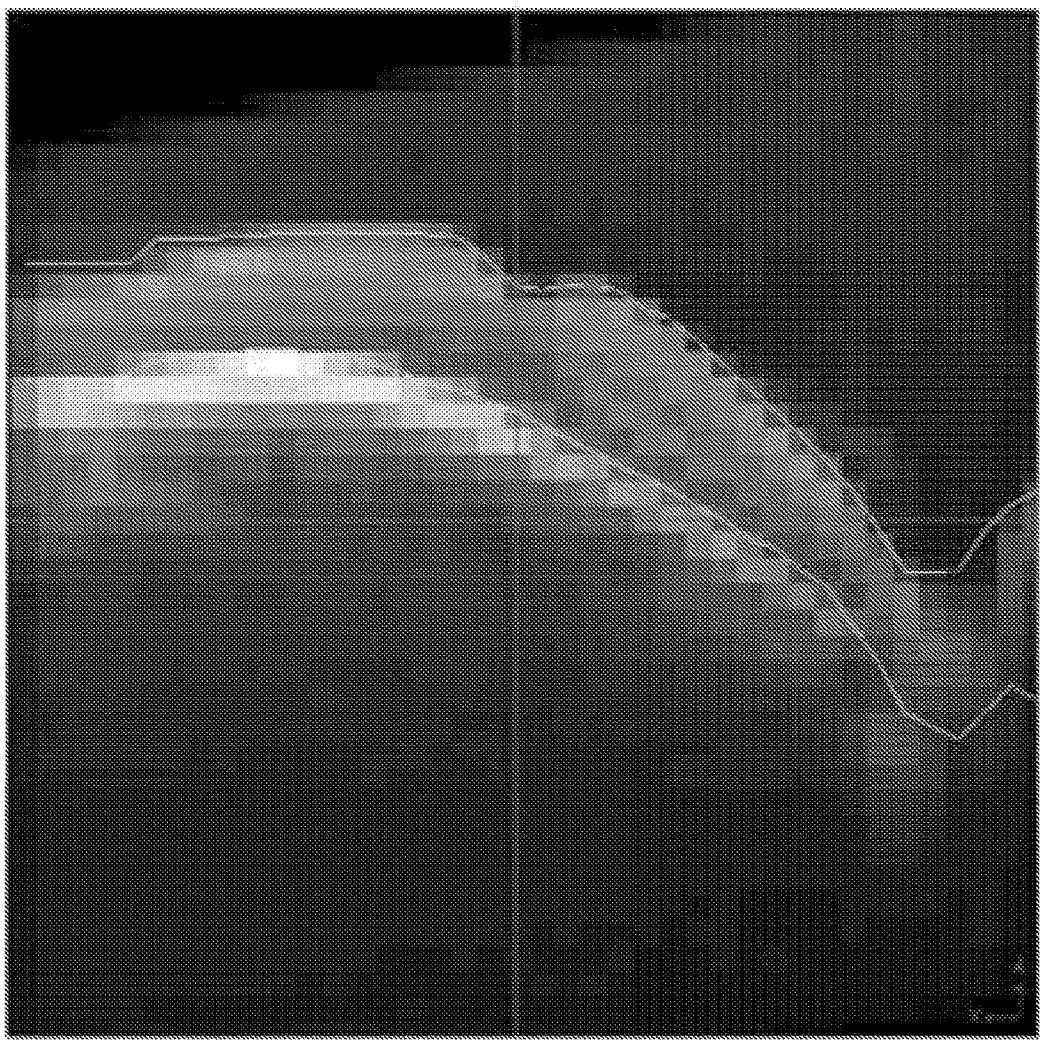
FIG. 12B shows a cross section perpendicular to the B-scan.
Figure 12C:
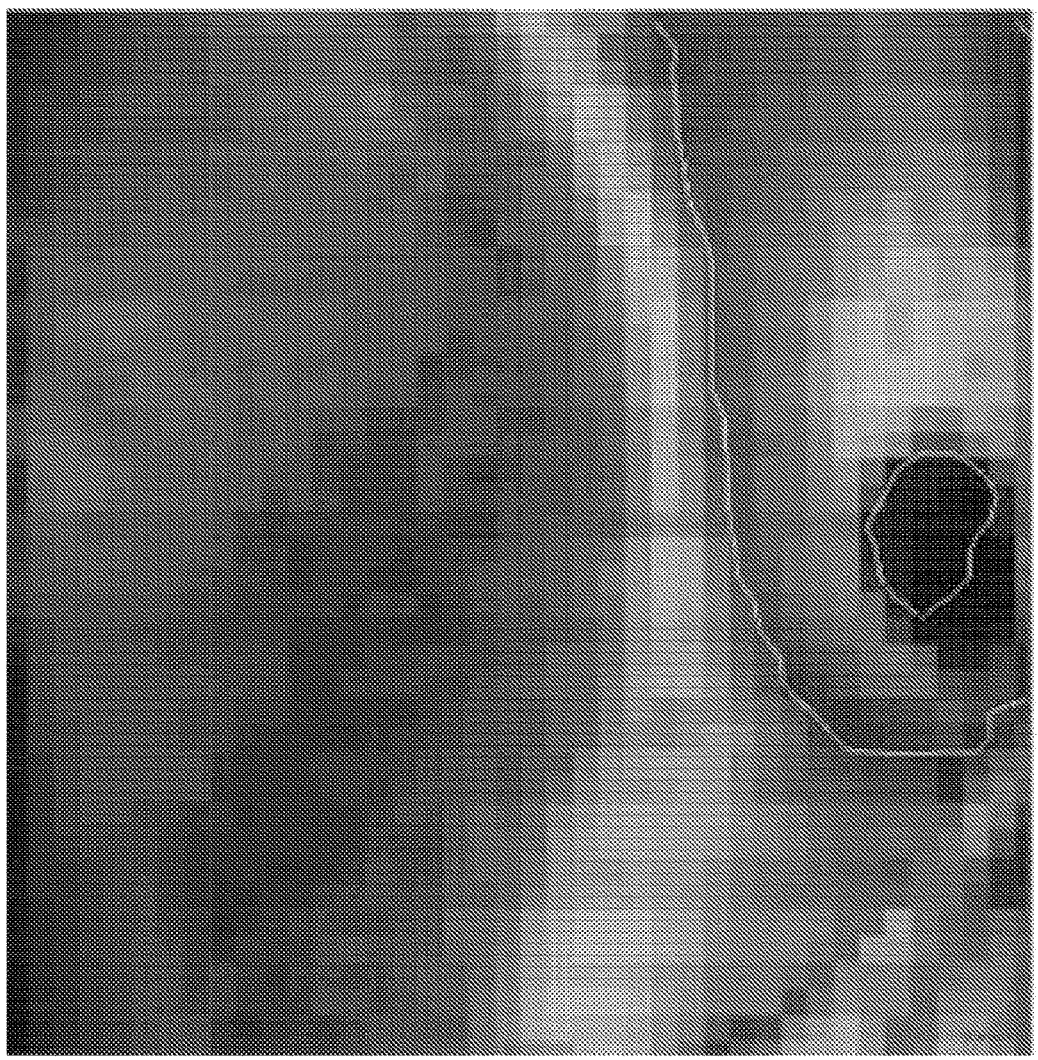
FIG. 12C shows a top view of the OCT volume.
Figure 12D:
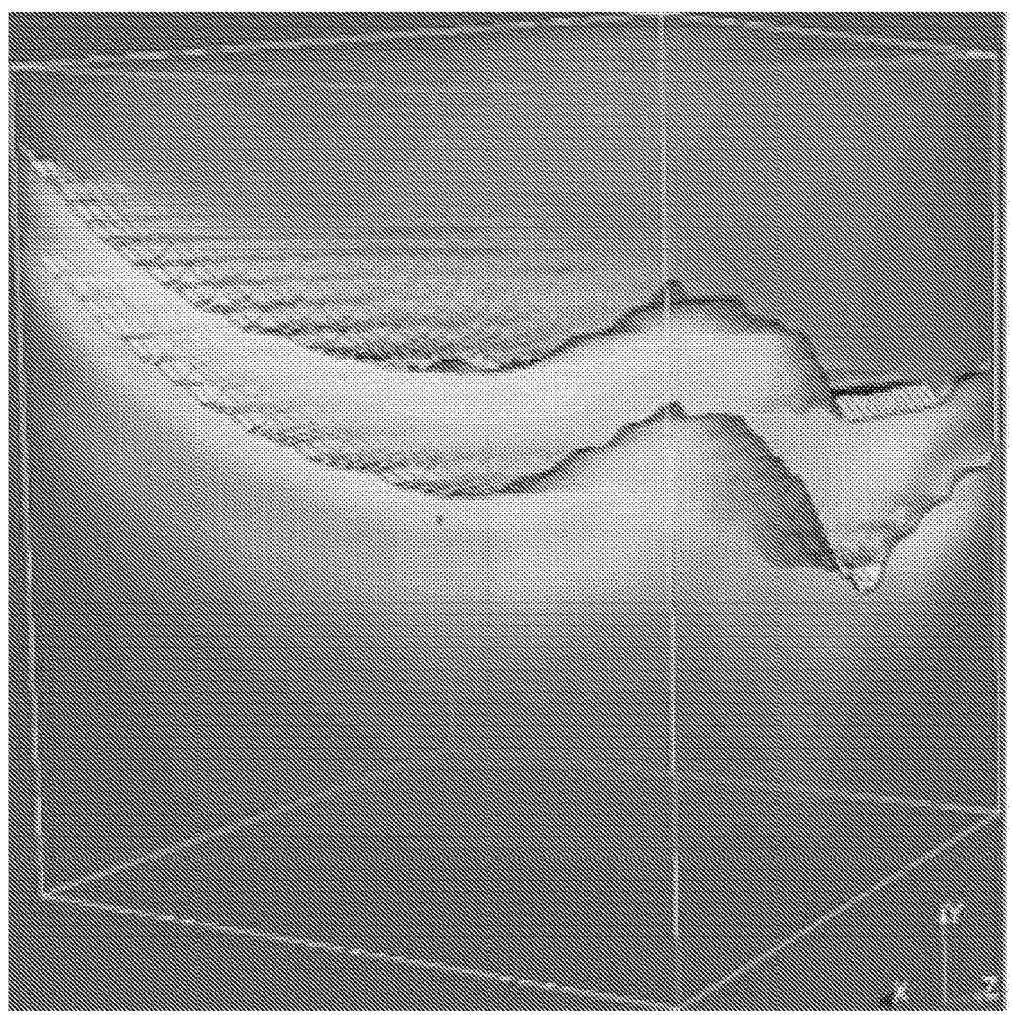
FIG. 12D shows a 3D volume rendering.

FIG. 12A, FIG. 12B, FIG. 12C, and FIG. 12D illustrate segmentation of OCT volume with non-Euclidean graph search. FIG. 12A shows a cross section of an example B-scan. FIG. 12B shows a cross section perpendicular to the B-scan. FIG. 12C shows a top view of the OCT volume. FIG. 12D shows a 3D volume rendering.

Figure 15A:
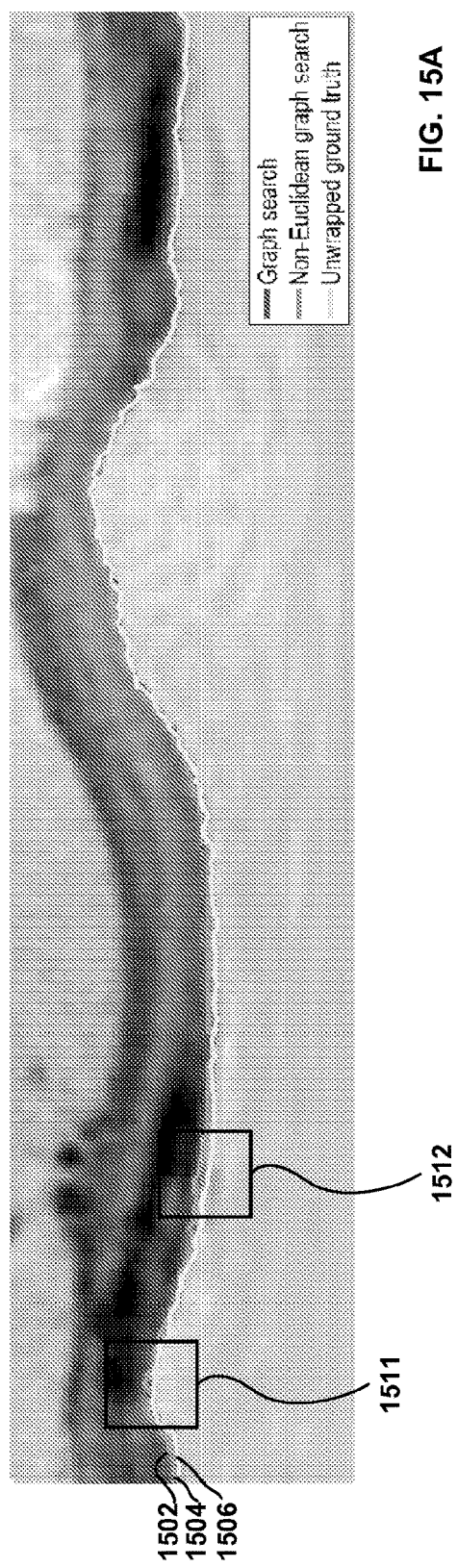
FIG. 15A shows an unwrapped slice of an example vascular wall.
Figure 15B:
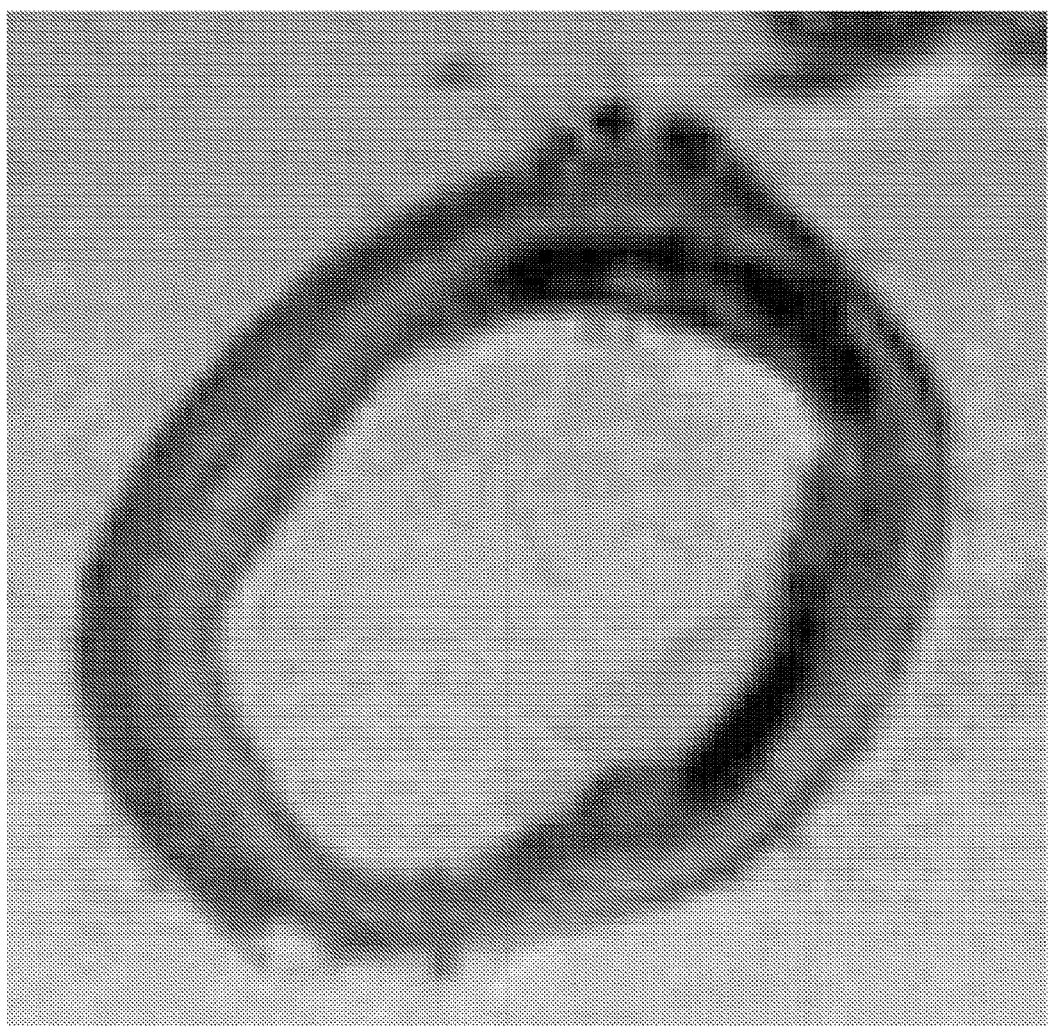
FIG. 15B shows an original slice of the unwrapped slice of the example vascular wall.

The unsigned thickness errors of both approaches over all 15370 A-scans ((40×40−7×9)×10) were sorted in ascending order and plotted in FIG. 14A for comparison. Non-Euclidean graph search can reduce the percentage of A-scans with an error larger than 0.5 voxel from 27.25% to 3.14%. Most errors larger than one voxel were produced at the region FIG. 15A, FIG. 15B, and FIG. 15C illustrate an example slice of vascular wall segmentation by conventional graph search at 1502 and non-Euclidean graph search at 1504, the truth is at 1506. FIG. 15A shows an unwrapped slice of an example vascular wall. FIG. 15B shows the original slice. FIG. 15C shows the example segmentation results. FIG. 16A and FIG. 16B illustrate a zoomed in view of vascular wall segmentation results in the unwrapped slice. FIG. 16A shows a zoomed in view of Region 1511 of FIG. 15A. FIG. 16B shows a zoomed in view of Region 1512 of FIG. 15A.

In one aspect, a three-dimensional graph search has been described and generalized herein to allow search in graphs in three-dimensional non-Euclidean space. This approach enables increased segmentation accuracy, at a subvoxel level, for terrain-like surfaces in layered tissues. The graph can be initially constructed in Euclidean space and then deformed using a deformation field so that the node density is increased near the expected surfaces, and decreased elsewhere. If the total number of nodes is kept constant, memory requirements and running time can be unchanged, except for the minimal time required to determine the deformation field from the volume data. The present methods and systems can be agnostic with respect to the calculation of the deformation field. The non-Euclidean approach can align node density with the inverse of the expected cost. All advantages of graph search can be retained including globally optimal surfaces in the time complexity of computing a single maximum flow in polynomial time, the flexibility of combining various in-region and on-surface costs, as well the capability of the use of context or shape priors for simultaneous segmentation of multiple surfaces.

The results on SD-OCT volumes of the retina and the vascular MR images show that subvoxel precision can be achieved and that accuracy compared to a reference standard obtained at subvoxel resolution can be superior to standard search of the graph in Euclidean space.

The present method and systems can generate the graph based on the underlying image content, using a generalized approach that allows non-equidistant voxels on a single axis—hence the use of the term non-Euclidean in the name of the approach. This approach can be readily extended to higher-dimensional image segmentation, for example 3D+time.

The advantages of increased, subvoxel accuracy while retaining memory and runtime requirements will allow either higher precision tissue measurements from images obtained with the same hardware, tissue measurements with the same precision as can be obtained with standard hardware with lower resolution imaging equipment, combinations thereof, and the like.

Figure 17:
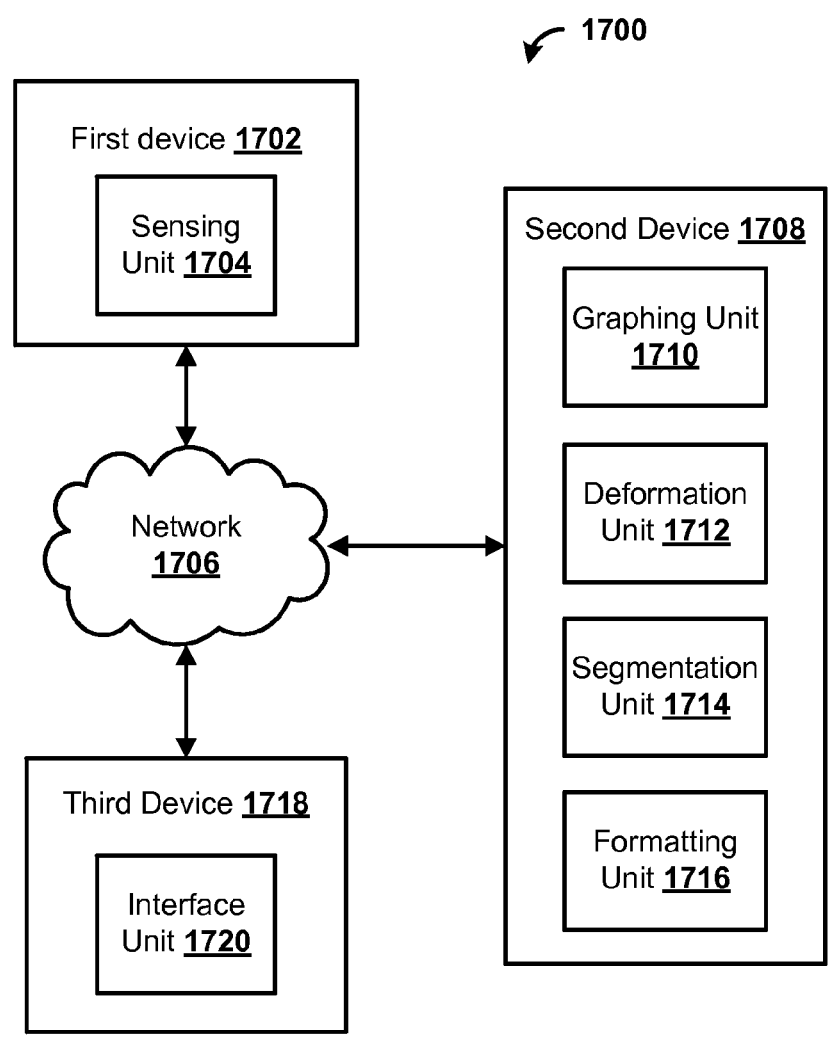
FIG. 17 is a block diagram illustrating an example system for analyzing data.

FIG. 17 is a block diagram illustrating an example system 1700 for analyzing data. Those skilled in the art will appreciate that present methods may be used in systems that employ both digital and analog equipment. One skilled in the art will appreciate that provided herein is a functional description and that the respective functions can be performed by software, hardware, or a combination of software and hardware.

In one aspect, the system 1700 can comprise a first device 1702 configured to receive data. For example, the first device 1702 can comprise a sensing unit 1704 configured to receive sensor data from one or more sensors. As an example, the sensing unit 1704 can be configured to receive sensor data based on optical coherence tomography, magnetic resonance imaging, x-ray computer tomography, ultrasound, LIDAR, RADAR, combinations thereof, and the like. The sensor data can be one dimensional, two dimensional, three dimensional, four dimensional, combinations thereof, and the like. In one aspect, the sensing unit 1704 can be configured to receive sensor data, such as volume data and/or intensity data. The volume data can be data present in the form of three-dimensional volume. Volume data can be voxels in an orthogonal graph in Euclidean space. Intensity data is defined is any multidimensional matrix of intensities that are to some degree correlated and where the intensities represent some property of an object at corresponding locations. As an example, the sensor data can comprise at least one continuous intensity function measured by a sensor. The sensing unit 1704 can be configured to receive sensor data based on the methods and systems described herein.

In one aspect, the first device 1702 can provide the sensor data to other devices through a network 1706. In one aspect, the network 1706 can comprise a packet switched network (e.g., internet protocol based network), and/or other network. The network 1706 can comprise network adapters, switches, routers, modems, and the like connected through wireless links (e.g., radio frequency, satellite) and/or physical links (e.g., fiber optic cable, coaxial cable, Ethernet cable, or a combination thereof). In one aspect, the network 1706 can be configured to provide communication from telephone, cellular, modem, and/or other electronic devices to and throughout the system 1700.

In one aspect, the system 1700 can comprise a second device 1708. The second device 1708 can comprise a computer, server, medical device, tablet, smart phone, workstation, and/or the like. The second device 1708 can be configured to request and/or receive the sensor data from the first device 1702. In one aspect, the second device 1708 can comprise a graphing unit 1710 configured to generate a graph based on the sensor data from the first device 1702. The graphing unit 1710 can be configured to generate one or more graphs based on the methods and systems described herein.

In one aspect, the second device 1708 can comprise a deformation unit 1712 configured to apply a deformation to the graph generated by the graphing unit 1710. For example, the deformation unit 1712 can determine a deformation (e.g., deformation field, vector, calculation) based on the data. The deformation unit 1712 can apply the deformation to a graph generated by the graphing unit 1710. As a further example, the deformation unit 1710 can generate a deformed graph by applying the deformation to the graph. The deformation unit 1712 can be configured to determine and apply one or more deformations to the graph based on the methods and systems described herein.

In one aspect, the second device 1708 can comprise a segmentation unit 1714 configured to identify one or more surfaces in the sensor data and/or otherwise segment. For example, the segmentation unit 1714 can identify one or more surfaces based on at least one of the deformed graph and/or the sensor data. As a further example, the segmentation unit 1714 can generate segmentation information indicative of the one or more surfaces. The segmentation unit 1714 can be configured to identify the one or more surfaces and/or otherwise perform segmentation based on the methods and systems described herein.

In one aspect, the second device 1708 can comprise a formatting unit 1716 configured to format the sensor data, deformed graph, segmentation information, and/or other information and/or data. As an example, the formatting unit 1716 can generate a representation of the sensor data, deformed graph, segmentation information, and/or other information and/or data. The representation can comprise a graph, image, three-dimensional model, and/or the like. The formatting unit 1716 can be configured to format the sensor data, deformed graph, segmentation information, and/or other information and/or data based on the methods and systems described herein.

In one aspect, the system 1700 can comprise a third device 1718. The third device 1718 can comprise a computer, tablet, medical device, smart phone, display, television, and/or the like. The third device 1718 can be configured to request and/or receive the sensor data, deformed graph, segmentation information, representation thereof, and/or other information from the second device 1708. In one aspect, the third device 1718 can comprise an interface unit 1720 configured to provide an interface to one or more users. For example, the interface unit 1720 can be configured to provide the sensor data, deformed graph, segmentation information, representation thereof, and/or other information to a user.

Figure 18:
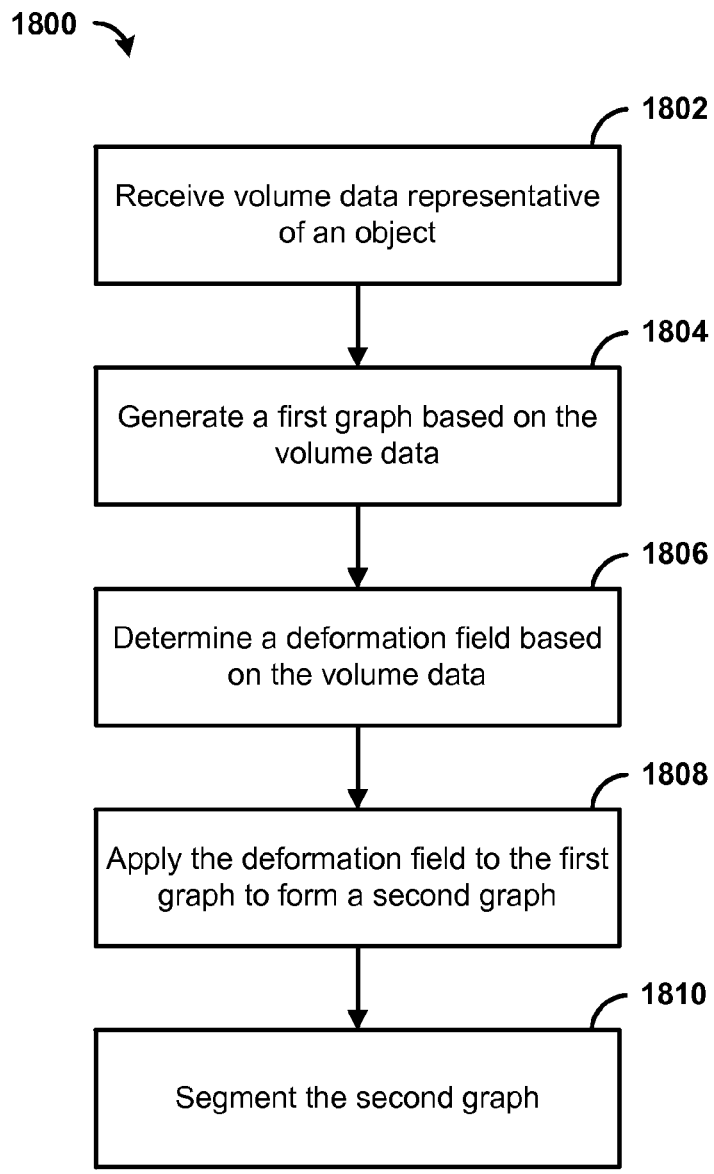
FIG. 18 is a flowchart illustrating an example method of analyzing data.

FIG. 18 is a flowchart illustrating an example method 1800 of analyzing data. At step 1802, volume data representative of an object can be received. The volume data can comprise volumetric intensity data. The volume data can comprise at least one continuous intensity function measured by a sensor. The at least one continuous intensity function can have a number of dimensions that is at least of a number of dimensions of the volume data. The volume data can be received based on optical coherence tomography. The volume data can be received based at least on one of magnetic resonance, x-ray computer tomography, ultrasound, LIDAR data, combinations thereof, and the like.

At step 1804, a first graph based on the volume data can be generated. The first graph can comprise nodes arranged in a Euclidean space. Generating the first graph based on the volume data can comprise generating an orthogonal grid of the nodes in Euclidean space. At least a portion of the nodes in Euclidean space can be based on intensity values of an imaged object. As a further example, generating a first graph based on the volume data can comprise discretizing the volume data into volumetric units.

At step 1806, a deformation field can be determined based on the volume data. When determining the deformation field based on the volume data, a work function can be determined based on the volume data. The work function can be the gradient vector field. Furthermore, a regularization function comprising a regularization imposed by a Gaussian kernel having a dimensionality equal to a dimensionality of the volume data can be determined. The regularization function confines the displacement of each node within each node's respective voxel, and determines a capture range towards a desired surface and its localization accuracy. In an aspect, any other regularization kernel besides Gaussian can be used. A convolution of the work function and the regularization function can be determined A negative gradient can be determined as a result of the convolution. As another example, determining the deformation field based on the volume data can comprise determining a gradient vector flow field.

At step 1808, the deformation field can be applied to the first graph to form a second graph. The second graph can comprise nodes arranged in a non-Euclidean space. The first graph and second graph can be of at least two dimensions. Applying the deformation field can comprise increasing node density near expected surfaces of the object. Applying the deformation field can comprise increasing node density where the saliency of the volume data increases. Applying the deformation field can comprise moving positions of nodes within the first graph causing variations in spacing between at least a portion of the nodes within the second graph.

At step 1810, the second graph can be segmented. Segmenting the second graph can comprise identifying at least one boundary indicative of a boundary between two parts of the object. Segmenting the second graph can comprise distinguishing between tissues or lesions. Segmenting the second graph can comprise determining a cost function associating cost values with volumetric units. The cost function assigns weights to each vertex between nodes in the graph and represents constraints about the relationships between graph nodes, such as smoothness of the surface or the inability of surfaces to cross. Each cost value can comprise an inverse to a likelihood that the corresponding volumetric unit is on a surface. Segmenting the second graph can comprise determining an optimal set of surfaces with a minimum total cost by summing the cost values associated with the volumetric units on the surfaces. Segmenting the second graph can comprise determining the cost value at a shifted node location based on the deformation field, e.g. determining the cost at shifted node location.

Figure 19:
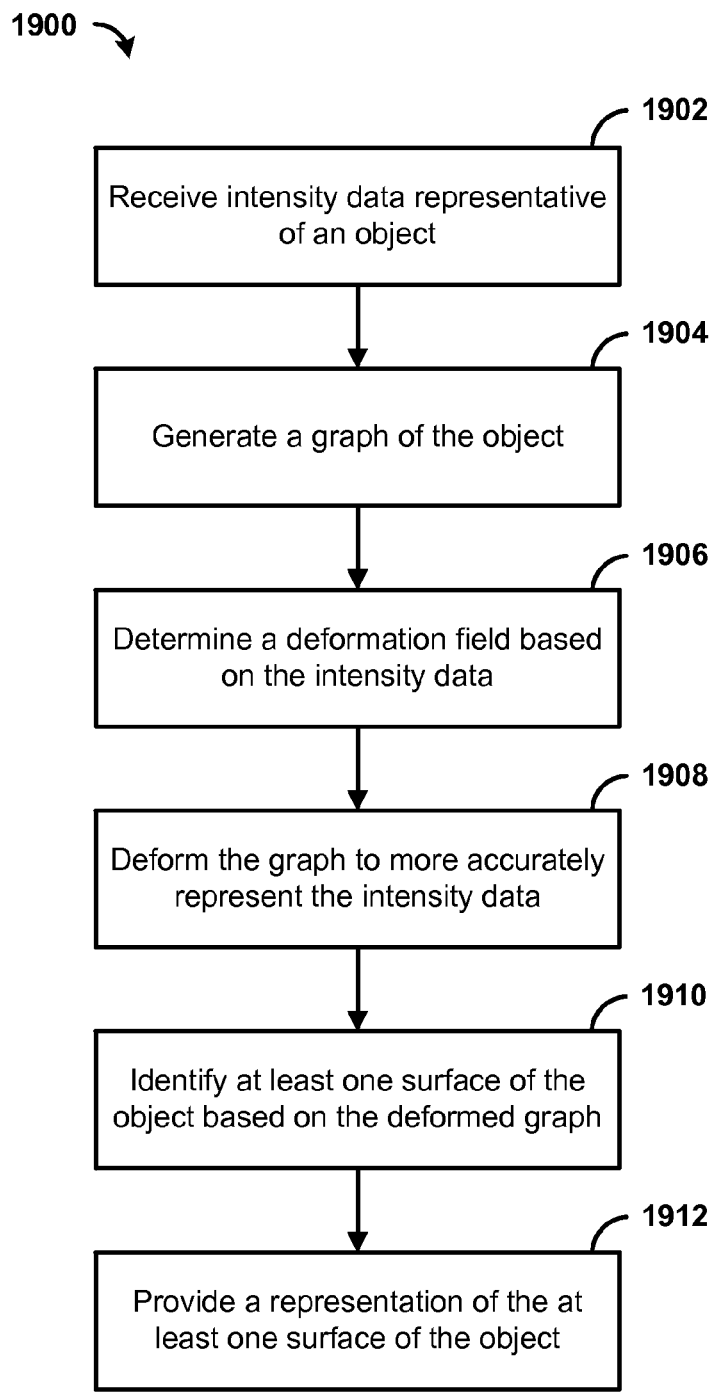
FIG. 19 is a flowchart illustrating another example method of analyzing data.

FIG. 19 is a flowchart illustrating an example method 1900 of analyzing data. At step 1902, intensity data representative of an object can be received. The intensity data can comprise volumetric intensity data. The intensity data can comprise at least one continuous intensity function measured by a sensor. The intensity data can be received based on optical coherence tomography. The intensity data can be received based at least on one of magnetic resonance, x-ray computer tomography, ultrasound, LIDAR data, combinations thereof, and the like.

At step 1904, a graph of the object can be generated. Generating the graph of the object can comprise generating an orthogonal grid of nodes in Euclidean space. At least a portion of the nodes in Euclidean space can represent corresponding intensity values. As another example, generating the graph of the object can comprise discretizing into volumetric units the intensity data.

At step 1906, a deformation field can be determined based on the intensity data. In one aspect, determining the deformation field based on the intensity data can comprise at least one of: determining a work function based on the intensity data, determining a regularization function comprising a regularization imposed by a Gaussian kernel having a dimensionality equal to a dimensionality of the intensity data, determining a convolution of the work function and the regularization function, determining a negative gradient of a result of the convolution. In another aspect, determining the deformation field based on the intensity data can comprise determining a gradient vector flow field.

At step 1908, the graph can be deformed to more accurately represent the intensity data. The graph and deformed graph can be of at least two dimensions. The graph can be deformed based on the deformation field. The graph can comprise a plurality of equally spaced nodes representing the intensity data. Deforming the graph can comprise repositioning at least a portion of the nodes closer to a location in the graph indicative of a feature of the object. Deforming the graph to more accurately represent the intensity data can comprise increasing node density near expected surfaces of the object. Deforming the graph to more accurately represent the intensity data can comprise increasing node density where the saliency of the intensity data increases. Deforming the graph to more accurately represent the intensity data can comprise moving positions of nodes within the graph causing variations in spacing between at least a portion of the nodes within the graph.

At step 1910, at least one surface of the object can be identified based on the deformed graph. Identifying at least one surface of the object based on the deformed graph can comprise identifying at least one boundary indicative of a boundary between two parts of the object. Identifying at least one surface of the object based on the deformed graph can comprise distinguishing between tissues, lesions, and/or the like. For example, the tissues and/or lesions can be tissues and/or lesions of an eye, lung, brain, vessel, prostate, bladder, and the like. Identifying at least one surface of the object based on the deformed graph can comprise determining a cost function associating cost values with volumetric units, wherein each cost value comprises an inverse to a likelihood that the corresponding volumetric unit is on a surface. Identifying at least one surface of the object based on the deformed graph can comprise determining an optimal set of surfaces with a minimum total cost by summing the cost values associated with the volumetric units on the at least one surface. Identifying at least one surface of the object based on the deformed graph can comprise determining the cost value at a shifted node location based on the deformation field.

At step 1912, a representation of the at least one surface of the object can be provided. For example, the representation can comprise an image, three-dimensional model, combinations thereof, and the like. In one aspect, the representation can indicate the location of the at least one surface. The location of the at least one surface can be indicated by a line (e.g., colored line, dashed line, combinations thereof, and the like), symbol, combinations thereof, and the like.

Figure 20:
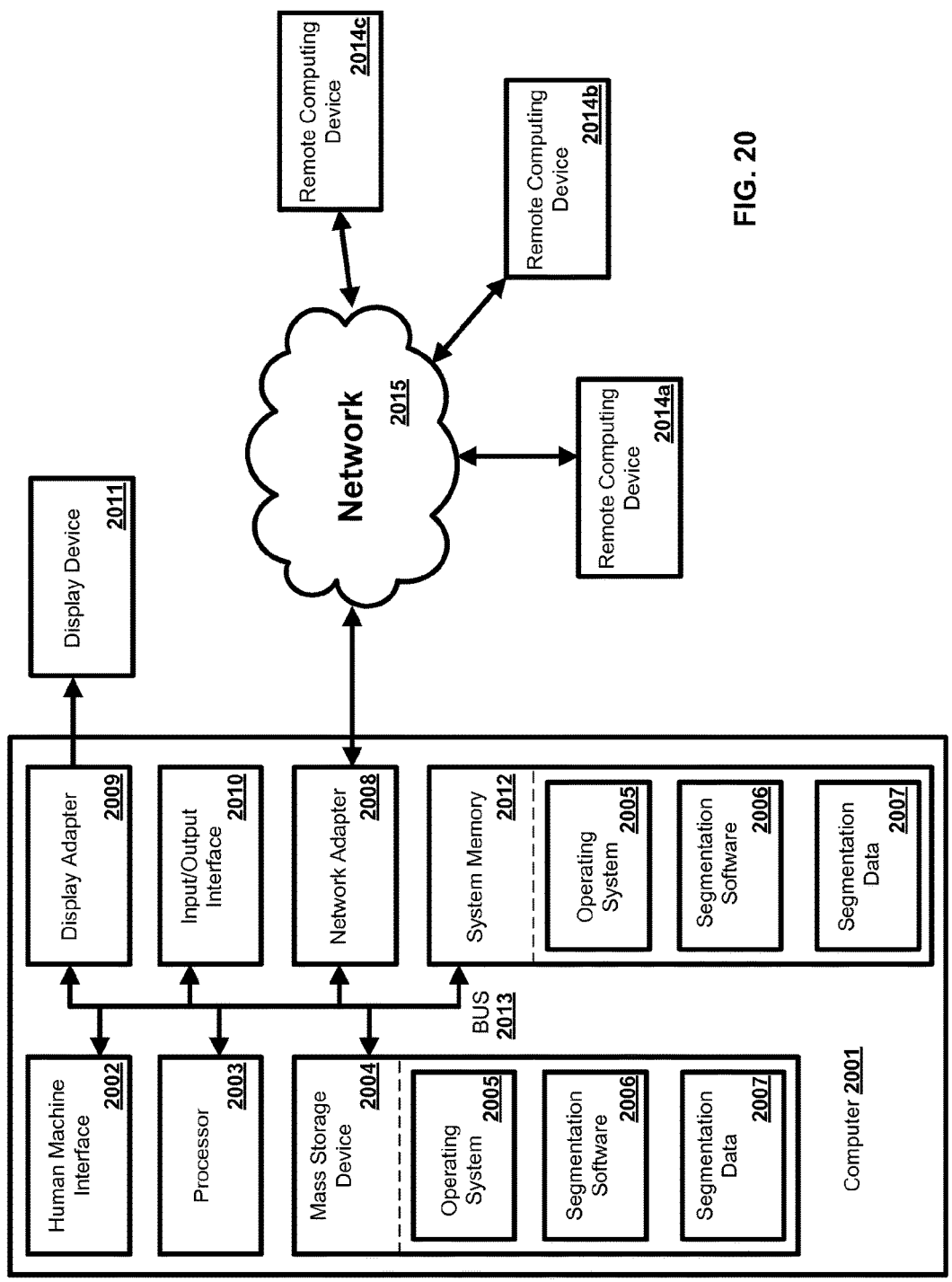
FIG. 20 is a block diagram illustrating an example computing device in which the disclosed methods and systems can be implemented.

In an exemplary aspect, the methods and systems can be implemented on a computer 2001 as illustrated in FIG. 20 and described below. By way of example, first device 1702, second device 1708, and/or third device 1718 of FIG. 17 can be a computer as illustrated in FIG. 20. Similarly, the methods and systems disclosed can utilize one or more computers to perform one or more functions in one or more locations. FIG. 20 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well-known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 2001. The components of the computer 2001 can comprise, but are not limited to, one or more processors or processing units 2003, a system memory 2012, and a system bus 2013 that couples various system components including the processor 2003 to the system memory 2012. In the case of multiple processing units 2003, the system can utilize parallel computing.

The system bus 2013 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 2013, and all buses specified in this description can also be implemented over a wired or wireless network connection and each of the subsystems, including the processor 2003, a mass storage device 2004, an operating system 2005, segmentation software 2006, segmentation data 2007, a network adapter 2008, system memory 2012, an Input/Output Interface 2010, a display adapter 2009, a display device 2011, and a human machine interface 2002, can be contained within one or more remote computing devices 2014a,b,c at physically separate locations, connected through buses of this form, in effect implementing a fully distributed system.

The computer 2001 can comprise a variety of computer readable media. Exemplary readable media can be any available media that is accessible by the computer 2001 and comprises, for example and not meant to be limiting, both volatile and non-volatile media, removable and non-removable media. The system memory 2012 comprises computer readable media in the form of volatile memory, such as random access memory (RAM), and/or non-volatile memory, such as read only memory (ROM). The system memory 2012 can contain data such as segmentation data 2007 and/or program modules such as operating system 2005 and segmentation software 2006 that are immediately accessible to and/or are presently operated on by the processing unit 2003.

In another aspect, the computer 2001 can also comprise other removable/non-removable, volatile/non-volatile computer storage media. By way of example, FIG. 20 illustrates a mass storage device 2004 which can provide non-volatile storage of computer code, computer readable instructions, data structures, program modules, and other data for the computer 2001. For example and not meant to be limiting, a mass storage device 2004 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 2004, including by way of example, an operating system 2005 and segmentation software 2006. Each of the operating system 2005 and segmentation software 2006 (or some combination thereof) can comprise elements of the programming and the segmentation software 2006. Segmentation data 2007 can also be stored on the mass storage device 2004. Segmentation data 2007 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computer 2001 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the processing unit 2003 via a human machine interface 2002 that is coupled to the system bus 2013, but can be connected by other interface and bus structures, such as a parallel port, game port, an IEEE 1394 Port (also known as a Firewire port), a serial port, or a universal serial bus (USB).

In yet another aspect, a display device 2011 can also be connected to the system bus 2013 via an interface, such as a display adapter 2009. It is contemplated that the computer 2001 can have more than one display adapter 2009 and the computer 2001 can have more than one display device 2011. For example, a display device can be a monitor, an LCD (Liquid Crystal Display), or a projector. In addition to the display device 2011, other output peripheral devices can comprise components such as speakers (not shown) and a printer (not shown) which can be connected to the computer 2001 via Input/Output Interface 2010. Any step and/or result of the methods can be output in any form to an output device. Such output can be any form of visual representation, including, but not limited to, textual, graphical, animation, audio, tactile, and the like. The display 2011 and computer 2001 can be part of one device, or separate devices.

The computer 2001 can operate in a networked environment using logical connections to one or more remote computing devices 2014a,b,c. By way of example, a remote computing device can be a personal computer, portable computer, smartphone, a server, a router, a network computer, a peer device or other common network node, and so on. Logical connections between the computer 2001 and a remote computing device 2014a,b,c can be made via a network 2015, such as a local area network (LAN) and/or a general wide area network (WAN). Such network connections can be through a network adapter 2008. A network adapter 2008 can be implemented in both wired and wireless environments. Such networking environments are conventional and commonplace in dwellings, offices, enterprise-wide computer networks, intranets, and the Internet.

For purposes of illustration, application programs and other executable program components such as the operating system 2005 are illustrated herein as discrete blocks, although it is recognized that such programs and components reside at various times in different storage components of the computing device 2001, and are executed by the data processor(s) of the computer. An implementation of segmentation software 2006 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method, comprising:
receiving volume data of a volumetric image representative of an object having at least one boundary indicative of separate parts of the object;
generating, based on the volume data, a first graph comprising a plurality of nodes each arranged in a Euclidean space in a respective voxel of a plurality of voxels associated with the object;
determining a deformation field based on the volume data;
applying the deformation field to the first graph to form a second graph comprising the plurality of nodes each arranged in a respective voxel in a non-Euclidean space, wherein distances between nodes neighboring the at least one boundary are smaller than distances between centers of voxels comprising the at least one boundary; and
segmenting the second graph.

2. The method of claim 1, wherein the volume data comprises volumetric intensity data related to an imaging modality.

3. The method of claim 1, wherein determining the deformation field based on the volume data comprises:
determining a work function based on the volume data;
determining a regularization function comprising a regularization imposed by a Gaussian kernel having a dimensionality equal to a dimensionality of the intensity data;
determining a convolution of the work function and the regularization function; and
determining a negative gradient of a result of the convolution.

4. The method of claim 1, wherein applying the deformation field to the first graph to form a second graph comprises increasing node density near expected surfaces of the object.

5. The method of claim 1, wherein generating the first graph based on the volume data comprises generating an orthogonal grid of the plurality of nodes in Euclidean space, wherein at least a portion of the nodes in Euclidean space represent corresponding intensity values related to an imaging modality.

6. The method of claim 1, wherein segmenting the second graph comprises identifying at least one boundary indicative of a boundary between two parts of the object.

7. The method of claim 1, wherein generating a first graph based on the volume data comprises discretizing into volumetric units the volume data, and wherein the volume data comprises at least one continuous intensity function measured by a sensor.

8. The method of claim 1, wherein segmenting the second graph comprises:
  determining a cost function associating cost values with volumetric units, wherein each cost value comprises an inverse to a likelihood that the corresponding volumetric unit is on a surface; and
  determining an optimal set of surfaces with a minimum total cost by summing the cost values associated with the volumetric units on the surfaces.

9. A method, comprising:
  receiving intensity data related to an imaging modality and representative of an object having at least one boundary indicative of separate parts of the object;
  generating a graph of the object comprising a plurality of nodes that are equally spaced apart, wherein each node of the plurality of nodes is situated at a center of a respective voxel of a plurality of voxels associated with the object;
  deforming the graph to more accurately represent the intensity data, wherein the deformed graph comprises the plurality of nodes each situated in a respective voxel, wherein distances between nodes neighboring the at least one boundary are smaller than distances between centers of voxels comprising the at least one boundary;
  identifying at least one surface of the object based on the deformed graph; and
  providing a representation of the at least one surface of the object.

10. The method of claim 9, wherein deforming the graph comprises repositioning at least a portion of the plurality of nodes closer to a location in the graph indicative of a feature of the object.

11. The method of claim 9, wherein the intensity data is received based at least on one of optical coherence tomography, magnetic resonance, x-ray computer tomography, ultrasound, and LIDAR data.

12. The method of claim 9, further comprising determining a deformation field based on the intensity data, wherein the graph is deformed based on the deformation field.

13. The method of claim 12, wherein determining the deformation field based on the intensity data comprises:
  determining a work function based on the intensity data;
  determining a regularization function comprising a regularization imposed by a Gaussian kernel having a dimensionality equal to a dimensionality of the intensity data;
  determining a convolution of the work function and the regularization function; and
  determining a negative gradient of a result of the convolution.

14. The method of claim 9, wherein deforming the graph to more accurately represent the intensity data comprises increasing node density near expected surfaces of the object.

15. The method of claim 9, wherein generating the graph of the object comprises generating an orthogonal grid of the plurality of nodes in Euclidean space, wherein at least a portion of the number of nodes in Euclidean space represent corresponding intensity values.

16. The method of claim 9, wherein identifying at least one surface of the object based on the deformed graph comprises identifying at least one boundary indicative of a boundary between two parts of the object.

17. The method of claim 9, wherein identifying at least one surface of the object based on the deformed graph comprises:
  determining a cost function associating cost values with volumetric units, wherein each cost value comprises an inverse to a likelihood that the corresponding volumetric unit is on a surface; and
  determining an optimal set of surfaces with a minimum total cost by summing the cost values associated with the volumetric units on the at least one surface.

18. A system, comprising:
  a memory having computer-executable instructions encoded thereon; and
  at least one processor functionally coupled to the memory and configured, by the computer-executable instructions, for,
    receiving volume data of a volumetric image representative of an object having at least one boundary indicative of separate parts of the object;
    generating, based on the volume data, a first graph comprising a plurality of nodes each arranged in a Euclidean space in a respective voxel of a plurality of voxels associated with the object;
    determining a deformation field based on the volume data;
    applying the deformation field to the first graph to form a second graph comprising the plurality of nodes each arranged in a respective voxel in a non-Euclidean space, wherein distances between nodes neighboring the at least one boundary are smaller than distances between centers of voxels comprising the at least one boundary; and
    segmenting the second graph.

19. The system of claim 18, wherein determining the deformation field based on the volume data comprises:
  determining a work function based on the volume data;
  determining a regularization function comprising a regularization imposed by a Gaussian kernel having a dimensionality equal to a dimensionality of the intensity data;
  determining a convolution of the work function and the regularization function; and
  determining a negative gradient of a result of the convolution.

20. The system of claim 18, wherein applying the deformation field comprises increasing node density near expected surfaces of the object.

21. The method of claim 3, wherein determining the deformation field based on the volume data is based on a machine learning technique comprising one or more neural networks.

22. The method of claim 3, wherein the Gaussian kernel is derived from one or more mathematical descriptions comprising at least Gaussian derivatives.

* * * * *